US009036720B2

(12) United States Patent
Scarpa et al.

(10) Patent No.: US 9,036,720 B2
(45) Date of Patent: May 19, 2015

(54) SYSTEMS AND METHODS FOR TRANSMITTING AND RECEIVING ADDITIONAL DATA OVER LEGACY SATELLITE DIGITAL AUDIO RADIO SIGNALS

(75) Inventors: Carl Scarpa, Plainsboro, NJ (US); Edward Schell, Jackson, NJ (US)

(73) Assignee: Sirius XM Radio Inc., New York, NY (US)

( * ) Notice: Subject to any disclaimer, the term of this patent is extended or adjusted under 35 U.S.C. 154(b) by 782 days.

(21) Appl. No.: 12/426,928

(22) Filed: Apr. 20, 2009

(65) Prior Publication Data
US 2009/0285155 A1    Nov. 19, 2009

Related U.S. Application Data

(63) Continuation-in-part of application No. 12/184,659, filed on Aug. 1, 2008, which is a continuation-in-part of application No. 12/416,027, filed on Mar. 31, 2009, and a continuation-in-part of application No.
(Continued)

(51) Int. Cl.
H04K 1/10       (2006.01)
H04L 27/28      (2006.01)
H04L 27/34      (2006.01)
H04L 27/00      (2006.01)
H04L 27/26      (2006.01)

(52) U.S. Cl.
CPC ........ *H04L 27/3488* (2013.01); *H04L 27/0008* (2013.01); *H04L 27/2601* (2013.01)

(58) Field of Classification Search
USPC ........................................................ 375/260
See application file for complete search history.

(56) References Cited

U.S. PATENT DOCUMENTS

| 4,821,120 A | 4/1989 | Tomlinson |
| 6,510,317 B1 | 1/2003 | Marko et al. |
| 6,512,749 B1 | 1/2003 | Wright et al. |
| 6,580,705 B1 | 6/2003 | Riazi et al. |

(Continued)

OTHER PUBLICATIONS

International Search Report and Written Opinion of the International Searching Authority, issued for corresponding PCT Application No. PCT/US2009/41174, dated Aug. 7, 2009.

*Primary Examiner* — Shuwang Liu
*Assistant Examiner* — Nader Bolourchi
(74) *Attorney, Agent, or Firm* — Kramer Levin Naftalis & Frankel LLP

(57) ABSTRACT

Systems and methods for transmitting and receiving additional data, such as video data, over legacy satellite digital audio radio signals are provided. In exemplary embodiments, hierarchical modulation can be used to transmit secondary information over a legacy signal. For example, the Sirius Satellite Digital Audio Radio Service ("SDARS") system may use a second layer of modulation to transmit video data on top of its regular audio signal. In order to support such future services within the original system design, sometimes referred to herein as a "legacy" system, additional information bandwidth can be acquired, for example, by using hierarchical modulation to overlay data for such new services on top of the legacy transmission. In such a system, for example, overlay data can be transmitted by applying a programmable angular offset to legacy QPSK symbols, for forming a new constellation similar to 8PSK.

36 Claims, 25 Drawing Sheets

Related U.S. Application Data

12/183,980, filed on Jul. 31, 2008, now abandoned, which is a continuation-in-part of application No. 12/079,782, filed on Mar. 28, 2008.

(60) Provisional application No. 61/124,626, filed on Apr. 18, 2008, provisional application No. 60/963,007, filed on Aug. 1, 2007, provisional application No. 61/072,638, filed on Mar. 31, 2008, provisional application No. 61/072,637, filed on Mar. 31, 2008, provisional application No. 60/962,780, filed on Jul. 31, 2007, provisional application No. 60/920,920, filed on Mar. 29, 2007.

(56) References Cited

U.S. PATENT DOCUMENTS

| | | | |
|---|---|---|---|
| 6,618,367 | B1 | 9/2003 | Riazi et al. |
| 6,798,791 | B1 | 9/2004 | Riazi et al. |
| 6,823,169 | B2 | 11/2004 | Marko et al. |
| 7,564,907 | B2 * | 7/2009 | Walker et al. ............ 375/260 |
| 2001/0034205 | A1 | 10/2001 | Tarr |
| 2006/0128309 | A1 | 6/2006 | Dateki et al. |
| 2006/0217875 | A1 * | 9/2006 | Oesterling et al. ........ 701/200 |
| 2007/0077882 | A1 * | 4/2007 | Patsiokas et al. ........ 455/3.04 |
| 2007/0142009 | A1 | 6/2007 | Scarpa et al. |

* cited by examiner

110

200

300

400

500

600

610

620

630

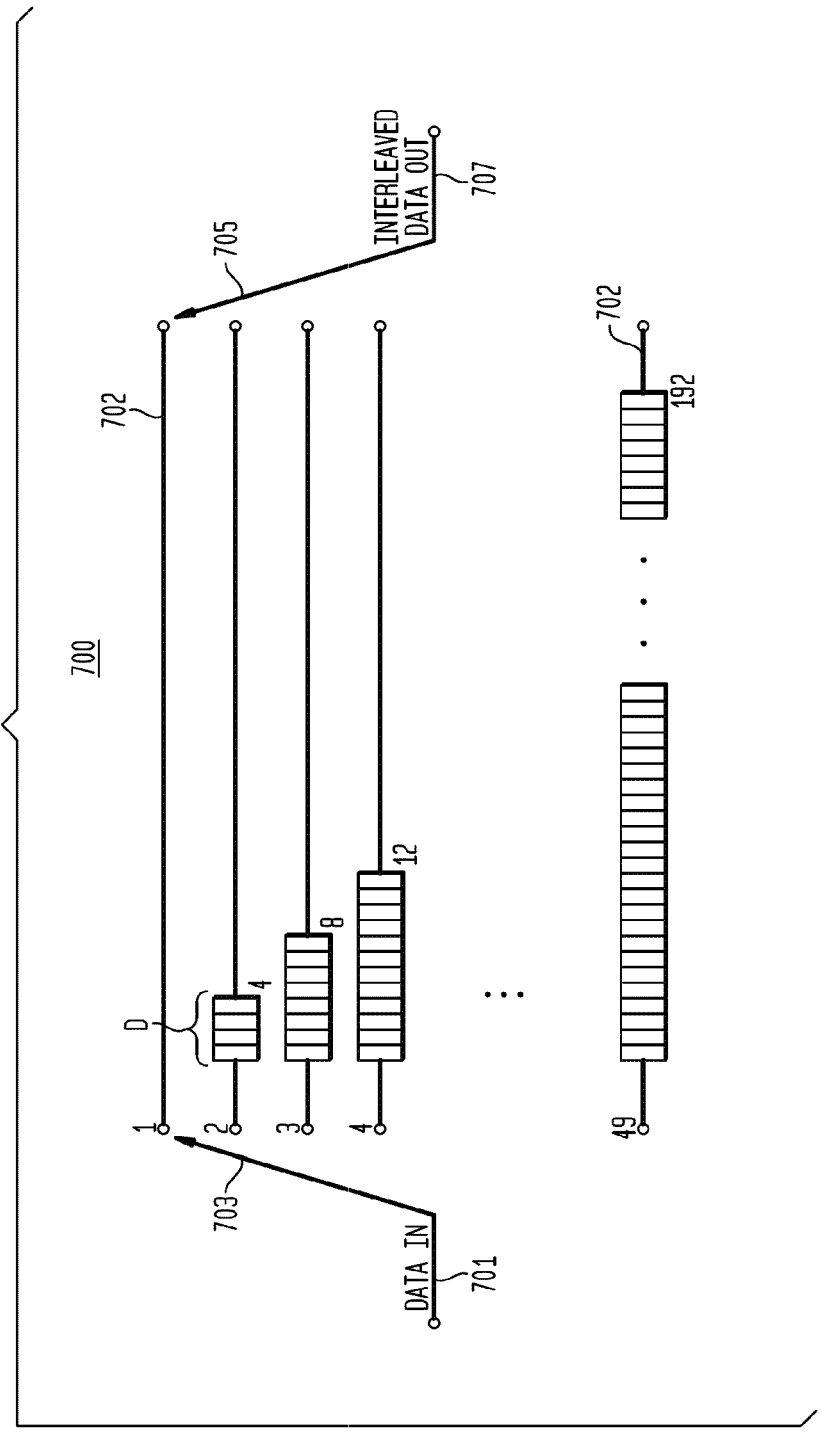

850

1800

1900

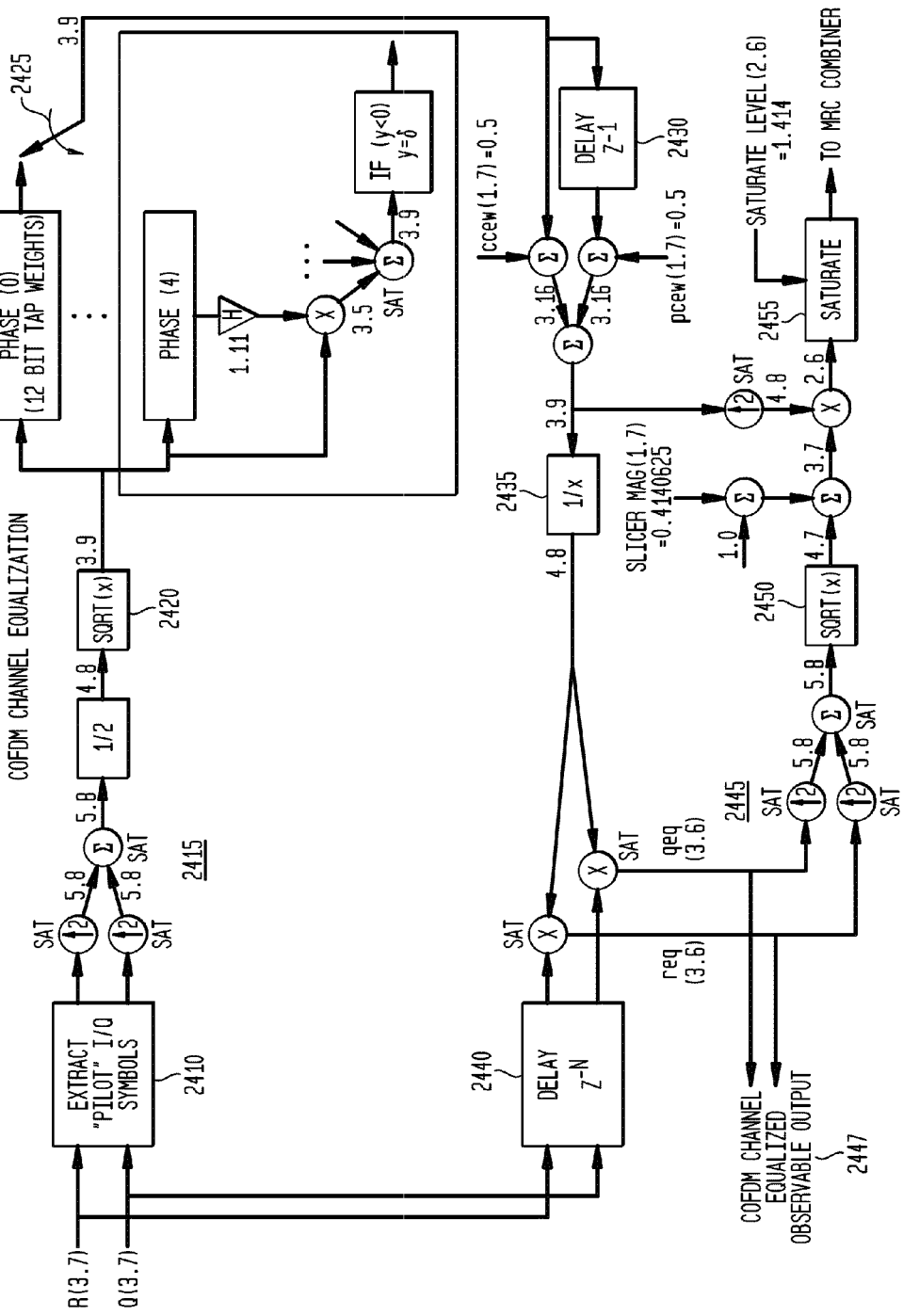

SYSTEMS AND METHODS FOR TRANSMITTING AND RECEIVING ADDITIONAL DATA OVER LEGACY SATELLITE DIGITAL AUDIO RADIO SIGNALS

CROSS-REFERENCE TO OTHER APPLICATIONS

This application claims the benefit of and hereby incorporates by reference U.S. Provisional Patent Application No. 61/124,626, entitled "SYSTEMS AND METHODS FOR VIDEO TRANSMISSION OVER DIGITAL SATELLITE RADIO LEGACY SIGNALS ('BACKSEAT TV TECHNOLOGY')", and filed on Apr. 18, 2008.

This application also claims priority to and the benefit of, and hereby incorporates by reference, co-pending U.S. Nonprovisional patent application Ser. No. 12/184,659 and U.S. Provisional Patent Application Nos. 60/963,007 and 61/072,638, each entitled "OVERLAY MODULATION TECHNIQUE FOR COFDM SIGNALS BASED ON AMPLITUDE OFFSETS", and filed on Aug. 1, 2008, Aug. 1, 2007, and Mar. 31, 2008, respectively. It is noted that said co-pending U.S. Nonprovisional patent application Ser. No. 12/184,659 also claims the benefit of said U.S. Provisional Patent Application Nos. 60/963,007 and 61/072,638.

This application also claims priority to and the benefit of, and hereby incorporates by reference, co-pending U.S. Nonprovisional patent application Ser. No. 12/416,027 and U.S. Provisional Patent Application No. 61/072,637, each entitled "OVERLAY MODULATION OF COFDM USING PHASE AND AMPLITUDE OFFSET CARRIERS", and filed on Mar. 31, 2009 and Mar. 31, 2008, respectively. It is noted that said co-pending U.S. Nonprovisional patent application Ser. No. 12/416,027 also claims the benefit of said U.S. Provisional Patent Application No. 61/072,637.

This application also claims priority to and the benefit of, and hereby incorporates by reference, co-pending U.S. Nonprovisional patent application Ser. No. 12/183,980 and U.S. Provisional Patent Application No. 60/962,780, each entitled "METHOD AND APPARATUS TO JOINTLY SYNCHRONIZE A LEGACY SDARS SIGNAL WITH OVERLAY MODULATION", and filed on Jul. 31, 2008 and Jul. 31, 2007, respectively. It is noted that said co-pending U.S. Nonprovisional patent application Ser. No. 12/183,980 also claims the benefit of said U.S. Provisional Patent Application No. 60/962,780.

This application also claims priority to and the benefit of, and hereby incorporates by reference, co-pending U.S. Nonprovisional patent application Ser. No. 12/079,782 and U.S. Provisional Patent Application No. 60/920,920, each entitled "HIERARCHICAL OFFSET COMPENSATION TO IMPROVE SYNCHRONIZATION AND PERFORMANCE", and filed on Mar. 28, 2008 and Mar. 29, 2007, respectively. It is noted that said co-pending U.S. Nonprovisional patent application Ser. No. 12/079,782 also claims the benefit of said U.S. Provisional Patent Application No. 60/920,920.

TECHNICAL FIELD

This application relates to satellite broadcast communications, and more particularly to systems and methods for transmitting and receiving additional data over pre-existing ("legacy") satellite digital audio radio signals.

BACKGROUND OF THE DISCLOSURE

Satellite radio services, such as, for example, the Satellite Digital Audio Radio Service ("SDARS") provided by Sirius Satellite Radio, Inc. ("Sirius"), successfully broadcast audio programs to millions of users. There is now a demand for these services to additionally provide video programming. However, given the existing bandwidth limitations and the large number of legacy receivers currently in the hands of subscribers, it is therefore desirable to allow new programming and new services (e.g., a new video service) to be provided over digital satellite radio legacy signals while not interfering with the existing legacy audio service.

SUMMARY OF THE DISCLOSURE

Systems and methods for transmitting and receiving additional data, such as video data, over legacy satellite digital audio radio signals are provided.

Hierarchical modulation may be used in a satellite broadcast communications system to transmit additional data, such as video data, over pre-existing signals by angularly offsetting and/or changing the amplitude of data symbols. Systems and methods are provided for receiving the transmitted signals and for removing the offsets resulting from the hierarchical modulation schemes to improve synchronization and performance in both legacy and hierarchical decoders and receivers of the satellite broadcast communications system. The overlay modulation system may exist in parallel with the legacy system so as to provide a robust overlay data rate while avoiding legacy reception degradation.

For example, according to some embodiments, there is provided a method of transmitting information over a satellite digital audio radio service ("SDARS") system. The method includes first modulating a legacy signal using a first modulation scheme to encode the legacy signal into a data stream of symbols, and second modulating the first-modulated symbols using a second layer of modulation to encode at least one additional signal. The method also includes receiving the twice modulated symbols at a receiver, and first demodulating the symbols to extract the legacy signal. The method may also include second demodulating the second layer of modulation to extract the at least one additional signal. The at least one additional signal may be a video signal. The receiving may include using antenna diversity. The first modulation scheme may be a Time Division Multiplexing ("TDM") scheme, such as a Quadrature Phase Shift Keying ("QPSK") scheme, or a Frequency Division Multiplexing ("FDM") scheme, such as a Coded Orthogonal Frequency Division Multiplexing ("COFDM") scheme. The second modulating may include phase modulating or amplitude modulating the first-modulated symbols. The receiver may include a legacy receiver.

According to some embodiments, there is provided a method of transmitting information over a SDARS system. The method includes error correction encoding an additional signal, interleaving the error correction encoded additional signal with an overlay identification marker ("OIM"), first modulating a legacy signal using a first modulation scheme to encode the legacy signal into a data stream of symbols, and second modulating the first-modulated symbols using a second layer of modulation to encode the interleaved additional signal. The OIM may convey a characteristic of the second layer of modulation, such as an amount of an overlay offset modulation.

According to some embodiments, a method of transmitting information over a SDARS is provided that includes first modulating a legacy signal using a first modulation scheme to encode the legacy signal into a first data stream of symbols, second modulating the first-modulated data stream of symbols using a second modulation scheme to encode an additional signal into a second data stream of symbols, and time delaying the twice modulated second data stream of symbols by a first period of time. The method also includes third modulating the legacy signal using a third modulation scheme to encode the legacy signal into a third data stream of symbols, fourth modulating the third-modulated data stream of symbols using a fourth layer of modulation to encode the additional signal into a fourth data stream of symbols, fifth modulating the legacy signal using a fifth modulation scheme to encode the legacy signal into a fifth data stream of symbols, sixth modulating the fifth-modulated data stream of symbols using a sixth layer of modulation to encode the additional signal into a sixth data stream of symbols, and time delaying the twice modulated sixth data stream of symbols by the first period of time.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIG. 7 illustrates a channel interleaver structure, in accordance with some embodiments of the invention;

FIG. 24 depicts an exemplary implementation of COFDM overlay channel equalization, in accordance with some embodiments of the invention.

DETAILED DESCRIPTION OF THE DISCLOSURE

Figure 1:
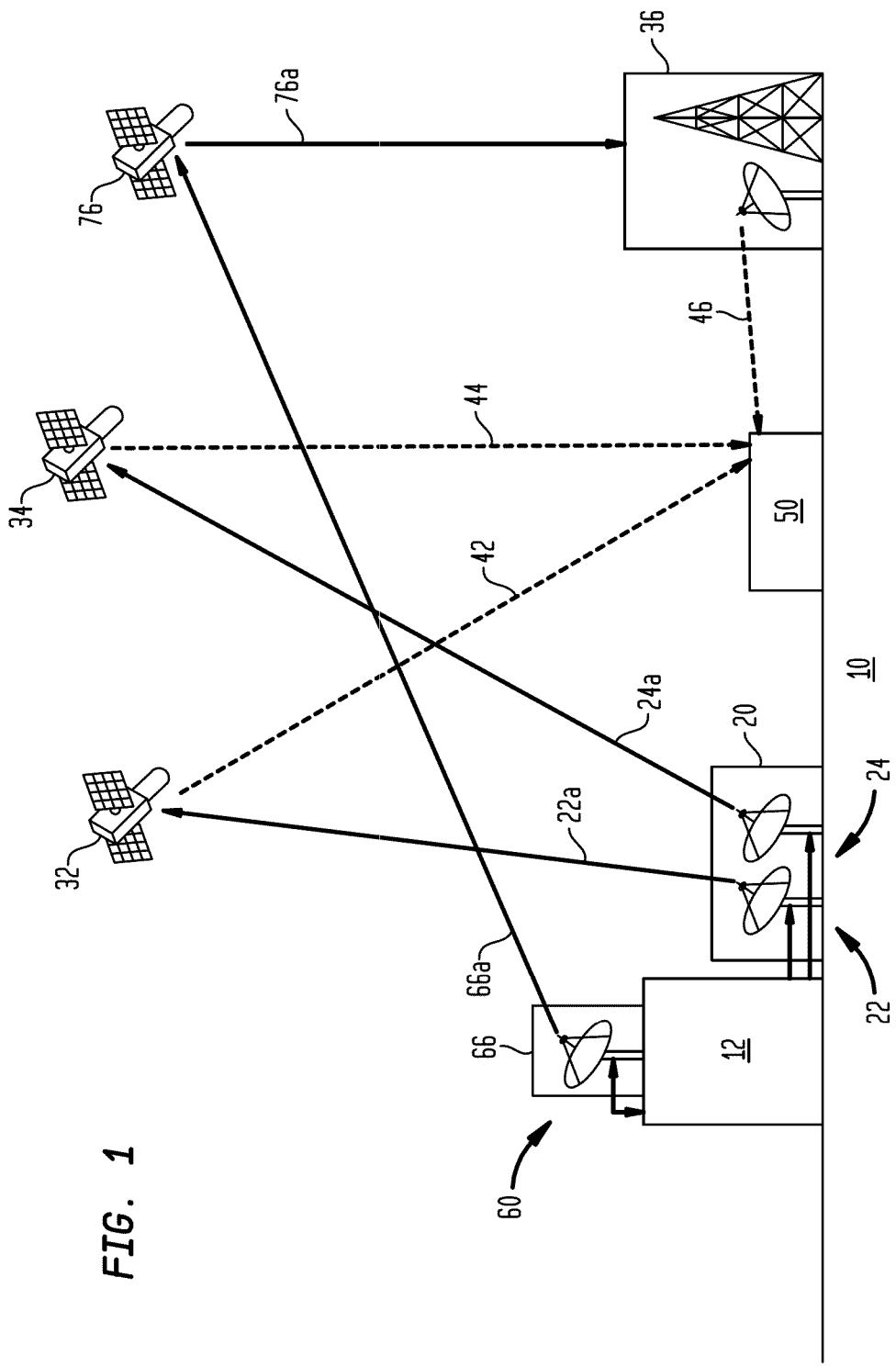
FIG. 1 illustrates a Satellite Digital Audio Radio Service ("SDARS") system architecture, in accordance with some embodiments of the invention.

In certain broadcast communications systems, such as, for example, satellite radio systems, hierarchical modulation ("HM") can be used to overlay additional data on top of a legacy transmission so as to obtain additional bandwidth. Such a scheme can be used, for example, to offer additional channels or services. For example, in the Sirius XM Radio Inc. ("Sirius") Satellite Digital Audio Radio Service ("SDARS"), video channels can be sent over existing audio channels via such an overlay modulation scheme. In such exemplary embodiments, a video signal, or any other additional type of information, can, for example, be sent in an overlay modulation layer or "layer 2" bit stream, on top of an existing audio service, known as the "legacy" signal or "layer 1" bit stream.

Satellite broadcast communication systems, such as, for example, Sirius' SDARS, can employ multiple redundant transmitted signals, and can, for example, use various forms of modulation to transmit information over a carrier signal, such as, for example, Time Division Multiplexing ("TDM") and Frequency Division Multiplexing ("FDM").

Quadrature Phase Shift Keying ("QPSK") is an exemplary TDM technique that can allow for the transmission of digital information across an analog channel. In QPSK, data bits can be grouped into pairs, with each pair represented by a particular waveform, commonly referred to as a symbol. There are four possible combinations of data bits in a pair, and a unique symbol is required for each possible combination of data bits in a pair. For example, QPSK can create four different symbols, one for each pair, by changing the I gain and Q gain for cosine and sine modulators. The symbol can then be sent across an analog channel after modulating a signal carrier. A receiver can demodulate the signal and look at the recovered symbol to determine which combination of data bits in a pair was sent.

Coded Orthogonal Frequency Division Multiplexing ("COFDM") is an exemplary FDM technique. COFDM can distribute a single digital signal across several (e.g., one thousand or more) signal carriers simultaneously, where coded data can be modulated and inserted into orthogonal carriers in the frequency domain. Because signals may be sent at right angles to each other, the signals effectively do not interfere with one another. In general, the term "multi-path effects" refers to the scattering of a signal due to obstructions such as canyons, buildings, and the like, that can cause a signal to take two or more paths to reach its final destination. COFDM is highly resistant to multi-path effects (also known as "ghosting") because it uses multiple carriers to transmit the same signal.

Additional information on legacy SDARS transmission and reception of signals using multiple modulation schemes, such as TDM and COFDM, may be found in Riazi et al. U.S. Pat. No. 6,580,705, Riazi et al. U.S. Pat. No. 6,618,367, and Riazi et al. U.S. Pat. No. 6,798,791, each of which is hereby incorporated by reference herein in its entirety. Hierarchical modulation can utilize a further modulation of a transmitted legacy bit or symbol, for example, as to amplitude, phase, or a combination of the two, to encode additional information on top of the legacy information. For example, additional data can be transmitted over legacy differential COFDM signals by changing the amplitude of legacy data symbols. Thus, the possible states a symbol can have may be interpreted differently in a system employing hierarchical modulation schemes than in a system using only conventional modulation techniques (e.g., Sirius' legacy TDM and COFDM signals without any hierarchical modulation). Thus, using hierarchical modulation two separate data streams can, for example, be transmitted over a single transmission channel. In systems employing hierarchical modulation schemes, one data stream can be used, for example, as a secondary data stream while the other can be used, for example, as a primary data stream.

Systems and methods for using hierarchical modulation to transmit and receive additional data over legacy satellite digital radio signals, while maintaining backward compatibility for legacy systems using only conventional modulation techniques, are provided and next described with reference to FIGS. 1-24.

FIG. 1 shows an illustrative implementation of a satellite digital audio radio service ("SDARS") system 10. System 10 may include a broadcast studio 12 that may generate one or more channels of program information (e.g., audio data for one or more radio shows, video data for one or more video programs, etc.) and control information (e.g., information as to who may access certain audio and video programs, etc.). System 10 may then broadcast this information over one or more transmission paths. For example, system 10 may broadcast the studio information as three signals, over three different transmission paths 42, 44, and 46, to one or more receivers 50.

As shown in FIG. 1, for example, two of the three signals may be broadcast over paths 42 and 44 via respective satellites 32 and 34 to receiver 50. These two signals may first be transmitted from studio 12 to a satellite uplink site 20. Satellite uplink site 20 may then transmit the two signals to respective satellites 32 and 34 over uplinks 22a and 24a, for example, via transmitters 22 and 24.

The third signal may be broadcast over path 46 via one or more terrestrial repeaters 36 to receiver 50. This third signal may first be transmitted from studio 12 to a very small aperture terminal ("VSAT") satellite uplink site 60. VSAT uplink site 60 may then transmit the signal to a VSAT satellite 76 over a VSAT uplink 66a, for example, via transmitter 66. VSAT satellite 76 may then transmit the signal to each terrestrial repeater 36 over a VSAT downlink 76a. It is to be appreciated that, in other embodiments, satellite 76 may be any other suitable type of satellite instead of a VSAT satellite and that uplink site 60 may be any other suitable type of uplink site instead of a VSAT satellite uplink site, such as a dedicated land line or via the internet.

Satellites 32 and 34 may broadcast the signals received from uplinks 22a and 24a, respectively, over transmission paths 42 and 44 to receiver 50, and each terrestrial repeater 36 may broadcast the signal received from downlink 76a over transmission path 46 to receiver 50. These three signals may be transmitted using two or more different modulation schemes. For example, the first and second signals may be transmitted via satellites 32 and 34 to receiver 50 over paths 42 and 44 using a TDM mode, and the third signal may be transmitted via terrestrial repeater 36 to receiver 50 over path 46 using a COFDM mode.

The combination of three transmission paths using both TDM and COFDM modes may provide for time, frequency, and space diversity within system 10. For example, the transmission of the signal over path 44 may be delayed with respect to the transmission of the signal over path 42 to provide time diversity. Moreover, terrestrial repeater 36 and satellites 32 and 34 may be physically spaced apart from one another to provide space diversity between the signals transmitted over paths 42, 44, and 46, while the difference between the TDM and COFDM modes may provide for frequency diversity.

The signals transmitted to receiver 50 over each one of transmission paths 42, 44, and 46 may occupy various portions of the frequency band available to the SDARS. For example, the signal transmitted to receiver 50 over each one of transmission paths 42, 44, and 46 may occupy approximately one-third (e.g., 4.167 MHz) of a 12.5 MHz band available to the SDARS. However, the signals transmitted over each uplink 22a and 24a, as well as the signals transmitted over VSAT uplink 66a and VSAT downlink 76a, may each occupy a frequency band other than the frequency band available to the SDARS (e.g., frequencies within the $K_U$ band).

Figure 1A:
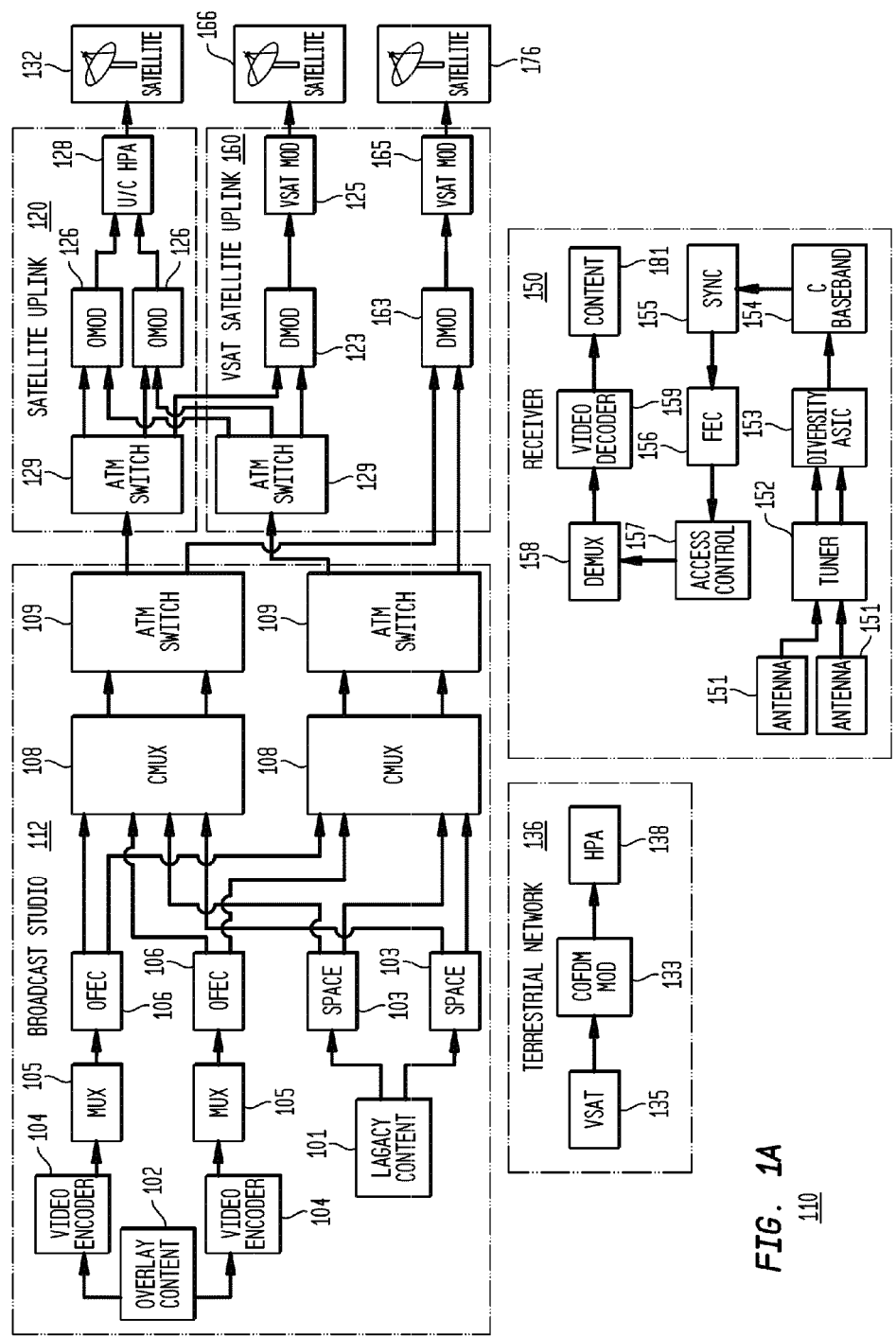
FIG. 1A illustrates a SDARS system architecture, similar to the system architecture of FIG. 1, but in greater detail, in accordance with some embodiments of the invention.

FIG. 1A shows an exemplary embodiment of a system 110 in greater detail. System 110 may be similar to system 10 of FIG. 1, and is discussed below in conjunction with FIGS. 2-22.

Figure 2:
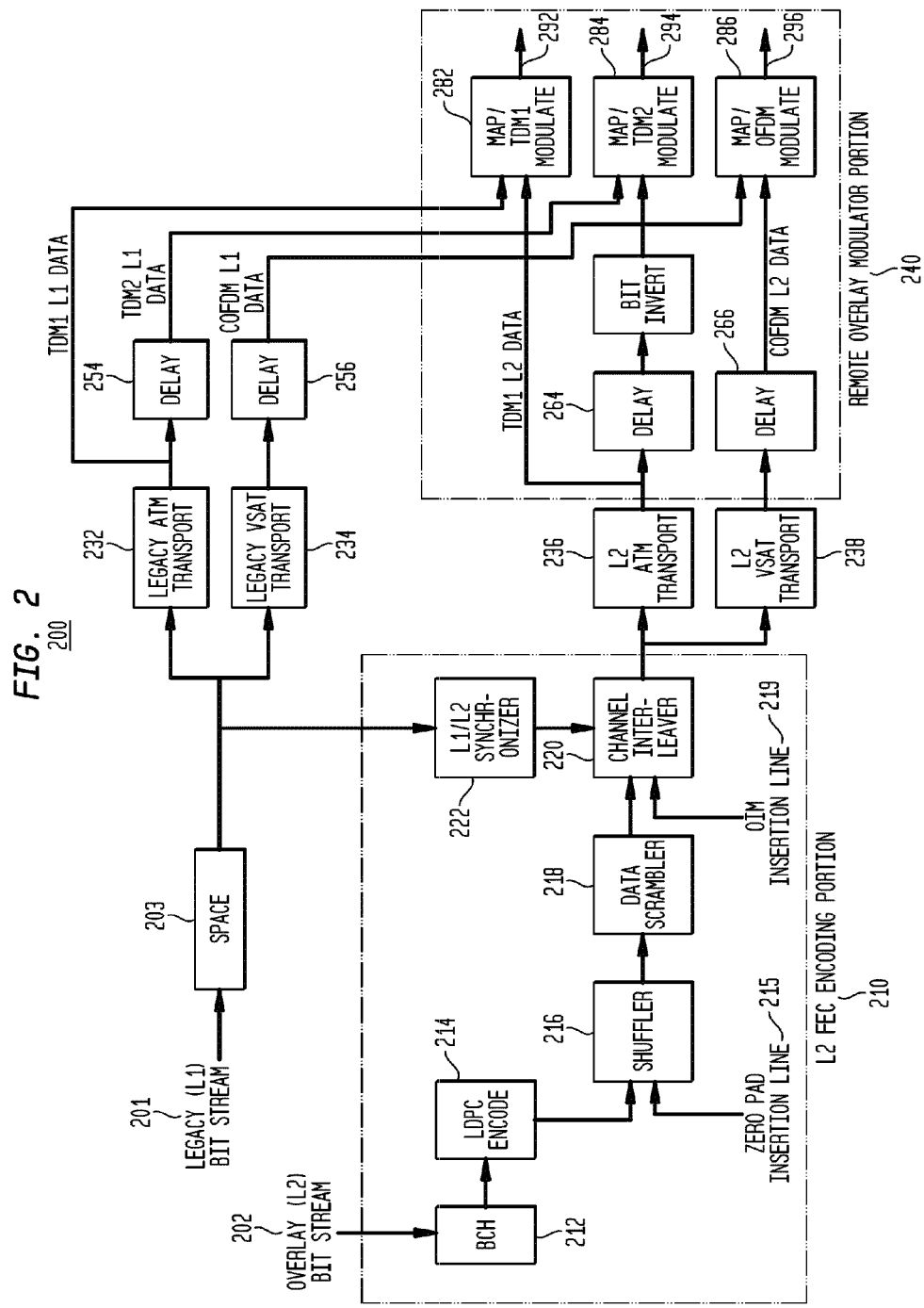
FIG. 2 illustrates an overlay encoding and modulation process, in accordance with some embodiments of the invention.

FIG. 2 shows an illustrative block diagram of an entire overlay processing portion 200 of system 10 (see, e.g., FIG. 1) for generating hierarchically modulated signals to be transmitted to receiver 50 of system 10. For example, a legacy data bit stream 201 (i.e., layer 1 or L1) may be hierarchically modulated in process 200 by an overlay bit stream 202 (i.e., layer 2 or L2) and transmitted through system 10. A discussion of process 200 is divided into three parts: (1) Forward Error Correction ("FEC") encoding; (2) transport to uplink modulators; and (3) physical layer modulation. Overlay FEC encoding is common to both satellite signal paths (e.g., transmission paths 42 and 44 of FIG. 1) and terrestrial signal paths (e.g., transmission path 46 of FIG. 1), which shall be performed at the location of the FEC encoding portions (e.g., OFECs 106 of FIG. 1A and portion 210 of FIG. 2 for overlay portions and SPACE 103 of FIG. 1A and unit 203 of FIG. 2). The composite overlay bit stream 202 (i.e., layer 2 or L2) may be provided at any suitable rate, such as at a rate of 2.771085 Mbits/second, for example. After the FEC encoding, composite overlay bit stream 202 may be transported to the satellite uplink facility and terrestrial repeater network of system 10. Then, the overlay framing and modulation of overlay bit stream 202 with respect to the legacy data bit stream 201 may be handled, for example, by each modulator unit of the system.

Additional overlay transport capacity may be required if non-real-time, and even additional overlay data may be supported by the system (e.g., layer 3 data). The additional capacity, which may only be found on the satellite signals and hence not required from the VSAT terminal, for example, may be about 869.864 Kbits/second.

FEC Encoding:

Overlay bit stream 202 may be FEC encoded by an FEC encoding portion 210 of processing portion 200. As shown in FIG. 2, FEC encoding portion 210 may include a Bose Chaudhuri Hocquenghem ("BCH") coding portion 212, a Low Density Parity Check ("LDPC") encoding portion 214, a shuffling portion 216, a data scrambling portion 218, an interleaving portion 220, and a synchronizing portion 222.

To improve system performance, an outer BCH code may be incorporated into the process of FEC encoding portion 210 by BCH coding portion 212. This code may be used to lower the residual error floor of the LDPC decoder at the receive side, and to minimize errors due to severe code puncturing (e.g., via fading or multipath). It is to be understood that in other embodiments, any other suitable error-correcting code may be incorporated into coding portion 212 of FEC encoding portion 210. The outer BCH code of BCH coding portion 212 may have any suitable correction factor, such as, for example, a correction factor of 12 bit errors. The BCH block code shall accept a number of source information bits, such as 12256 source information bits from overlay bit stream 202. The output of BCH encoding portion 212 may be the original source bits followed by a particular number of parity bits, such as, for example, 168 parity bits, for forming a BCH block code of 12424 bits. Therefore, the coding rate of this outer code may be 12256/12424 (i.e., 0.986), for example. The encoded block size of 12424 bits can be achieved using the encoding procedure outlined below. Data may be applied to and output from BCH encoding portion 212 at any suitable rates. In some embodiments, data may be applied to the BCH input of BCH coding portion 212 at a rate of 917.3075295 Kbits/second, and the output of BCH coding portion 212 may be 929.8815884 Kbits/second, for example.

Figure 3:
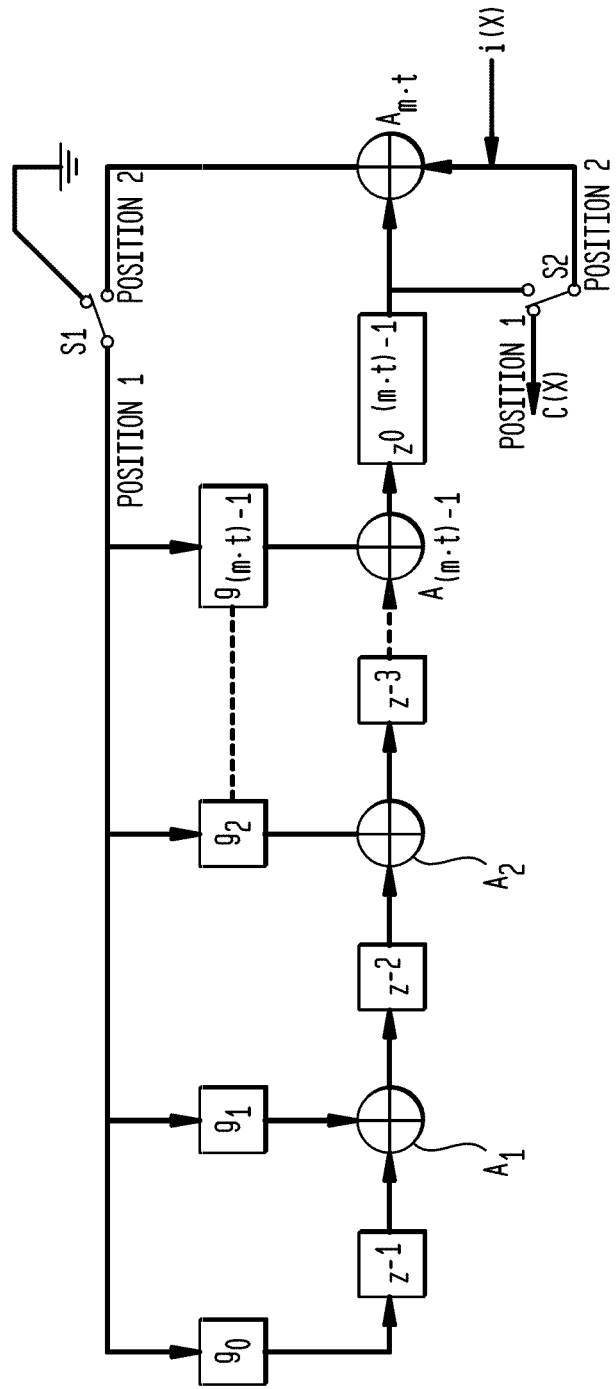
FIG. 3 illustrates an encoding circuit for a Bose Chaudhuri Hocquenghem ("BCH") encoder, in accordance with some embodiments of the invention.

FIG. 3 shows an illustrative encoding circuit 300 that may be used for BCH coding portion 212 of FIG. 2. Encoding circuit 300 may be for an (n, k) BCH code with the following parameters: "m" may be any suitable galois field size, such as 14; "n"=$2^m-1$ and may be any suitable length of codeword in bits, such as 12424 bits; "t" may be the maximum number of error bits that can be corrected by encoding circuit 300, such as 12 error bits; "k"$\geq$n−m*t and may be any suitable number of information bits in a codeword, such as 12256 bits; "$d_{min}$"$\geq$2*t+1 and may be any suitable minimum distance, such as 25; and "m*t" may be any suitable number of parity bits, such as 168 parity bits.

The BCH encoding operation of BCH coding portion 212 may begin as follows for each code block. At the start of each code block generation, all registers in encoding circuit 300 of FIG. 3 may be reset to zero. Information bits 1 to k may be applied to encoding circuit 300 with both switches S1 and S2 in their respective position 2. Modulo 2 arithmetic may be used at each adder stage A of encoding circuit 300. After the last input data bit of input i(x) is applied, both switches S1 and S2 may be placed in their respective position 1. Then, circuit 300 may be clocked an additional m*t times to generate the m*t parity bits, for completing the BCH code block length of data plus parity bits. For example, in accordance with the above given exemplary values, circuit 300 may be clocked an additional 168 times to generate the 168 parity bits, for completing the BCH code block length of 12424 data plus parity bits.

The coefficients $g_i$ that may represent the tap weights of encoding circuit 300 of FIG. 3 may be those listed in the following table for a circuit with a galois field size of 14, for example.

| | |
|---|---|
| $g_1(z)$ | $1 + z + z^{-3} + z^{-5} + z^{-14}$ |
| $g_2(z)$ | $1 + z^{-6} + z^{-8} + z^{-11} + z^{-14}$ |
| $g_3(z)$ | $1 + z + z^{-2} + z^{-6} + z^{-9} + z^{-10} + z^{-14}$ |
| $g_4(z)$ | $1 + z^{-4} + z^{-7} + z^{-8} + z^{-10} + z^{-12} + z^{-14}$ |
| $g_5(z)$ | $1 + z^{-2} + z^{-4} + z^{-6} + z^{-8} + z^{-9} + z^{-11} + z^{-13} + z^{-14}$ |
| $g_6(z)$ | $1 + z^{-3} + z^{-7} + z^{-8} + z^{-9} + z^{-10} + z^{-14}$ |
| $g_7(z)$ | $1 + z^{-2} + z^{-5} + z^{-6} + z^{-7} + z^{-10} + z^{-11} + z^{-13} + z^{-14}$ |
| $g_8(z)$ | $1 + z^{-5} + z^{-8} + z^{-9} + z^{-10} + z^{-11} + z^{-14}$ |
| $g_9(z)$ | $1 + z + z^{-2} + z^{-3} + z^{-9} + z^{-10} + z^{-14}$ |
| $g_{10}(z)$ | $1 + z^{-3} + z^{-6} + z^{-9} + z^{-11} + z^{-12} + z^{-14}$ |
| $g_{11}(z)$ | $1 + z^{-4} + z^{-11} + z^{-12} + z^{-14}$ |
| $g_{12}(z)$ | $1 + z + z^{-2} + z^{-3} + z^{-5} + z^{-6} + z^{-7} + z^{-8} + z^{-11} + z^{-13} + z^{-14}$ |

The generator polynomial g(z) of the t error correcting BCH code for circuit 300 may be obtained by multiplying the first t polynomials in the above table. This may result in the following Standard Generator Polynomial:

$$g(z^-) = 1 + z^{-2} + z^{-5} + z^{-7} + z^{-8} + z^{-10} + z^{-16} + z^{-19} + z^{-20} + z^{-24} + z^{-28} + z^{-30} + z^{-31} + z^{-32} + z^{-33} + z^{-34} + z^{-36} + z^{-38} + z^{-39} + z^{-40} + z^{-41} + z^{-42} + z^{-45} + z^{-46} + z^{-47} + z^{-48} + z^{-49} + z^{-50} + z^{-51} + z^{-55} + z^{-57} + z^{-60} + z^{-62} + z^{-64} + z^{-67} + z^{-69} + z^{-70} + z^{-76} + z^{-79} + z^{-80} + z^{-81} + z^{-85} + z^{-87} + z^{-88} + z^{-89} + z^{-93} + z^{-96} + z^{-98} + z^{-99} + z^{-102} + z^{-103} + z^{-105} + z^{-109} + z^{-110} + z^{-113} - z^{-116} + z^{-117} + z^{-119} + z^{-120} + z^{-123} + z^{-125} + z^{-126} + z^{-131} + z^{-132} + z^{-135} + z^{-137} + z^{-139} + z^{-141} + z^{-142} + z^{-143} + z^{-144} + z^{-145} + z^{-147} + z^{-148} + z^{-150} + z^{-151} + z^{-153} + z^{-157} + z^{-158} + z^{-166} + z^{-168}.$$

In compact form, this encoding polynomial may be expressed as the following:

$$G = [10100101101000001001100010001011111$$
$$01011111001111111000101001010100101$$
$$10000010011100010111000100101011001101$$
$$00011001001101100101100001100101010$$
$$111101101101000110000000101].$$

Output c(x) of BCH encoding circuit 300 of BCH coding portion 212 may be provided as the input to LDPC encoding portion 214 of FEC encoding portion 210 of FIG. 2. It is to be understood that in other embodiments, any other suitable error-correcting code may be incorporated into encoding portion 214 of FEC encoding portion 210. The inner code used by LDPC encoding portion 214 for the overlay FEC may include any suitable code, such as, for example, an Extended Irregular Repeat Accumulate ("eIRA") LDPC code. The inner code rate may be any suitable rate, such as ⅓ (or, more particularly, 0.335838), with any suitable block size (i.e., data+parity), such as a block size of 36994 bits. The LDPC encoder of LDPC encoding portion 214 may first output parity bits, such as 24570 parity bits, followed by encoded data bits, such as 12424 encoded data bits. The LDPC encoder of LDPC encoding portion 214 may accept data at any suitable data rate, such as at an input rate of 929.8815884 Kbits/second. The final output rate of the LDPC encoder of LDPC encoding portion 214 may be at any suitable rate, such as, for example, at a rate of 2.768837692 Mbits/second.

Each LDPC code block of LDPC encoding portion 214 (e.g., of length 36994) may be distributed over any suitable number of frames, such as, for example, 49 physical frames. The first 48 physical frames may contain a first number of bits, such as 755 bits, and the last physical frame may contain a second number of bits, such as 754 bits. To ease hardware state machine design, the last physical frame of each LDPC code block of LDPC encoding portion 214 may be amended by a number of zero bits (e.g., 1 zero bit) with zero pad insertion line 215 of FIG. 2, which may force the last physical frame to contain the same amount of bits as the preceding physical frames of the code block. This process may be repeated for each of the code blocks within a transmission frame. The final output rate of the LDPC encoder of LPDC encoding portion 214 with zero padding may be any suitable rate, such as, for example, 2.768912537 Mbits/second. In some embodiments, each LDPC code block may include 49 physical frames, and each transmission frame may include 26 code blocks, for example.

Additional randomness to the channel interleaving process may be provided via a suitable shuffling portion 216. System performance may be improved by feeding interleaving portion 220 with a random selection of physical frames from each LDPC code block produced by encoding portion 214, as opposed to providing a straight feed of physical frames from each LDPC code block to interleaving portion 220, which may lead to consecutive data block errors under long fade intervals.

For example, shuffling portion 216 may be provided in the data path between encoding portion 214 and interleaving portion 220. In some embodiments, shuffling portion 216 may provide an S-random physical frame shuffler. An S-Random shuffler may shuffle each of the physical frames per LDPC code block, for example, by using a different random pattern for each of the code blocks ("CB") within a transmission frame.

Shuffling portion 216 of layer 2 FEC encoding 210 may start a shuffling process at the beginning of each transmission frame. Each CB may be permuted as dictated, for example, by any suitable S-random table. An S-random table may consist of any suitable number of elements, grouped into any suitable number of columns of non-repeating random numbers within any suitable range. For example, in some embodiments, a suitable S-random table may include 1274 elements, grouped into 26 columns (e.g., the number of LDPC CBs in a transmission frame), and each column may include non-repeating random numbers ranging from 1 to 49 (e.g., the number of physical frames per LDPC CB). Each column may represent the physical frame permutation pattern applied to its respective CB within a transmission frame. For example, the first 49 elements of a first column of the table may be used to shuffle the first CB with respect to a transmission frame boundary, and the second CB may be shuffled by the second column and so on. This process may be repeated for all of the code blocks within a transmission frame. Each transmission frame may shuffle every CB using the same S-random table.

Figure 4:
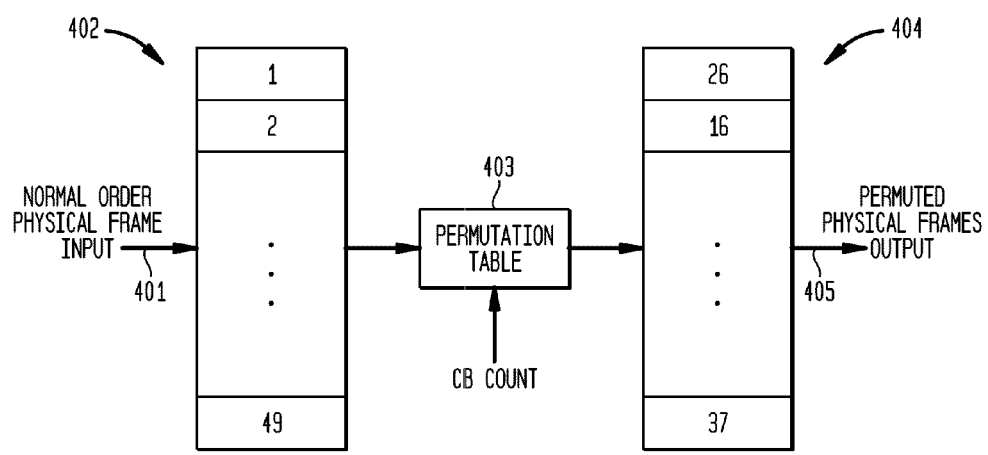
FIG. 4 illustrates a physical frame shuffler, in accordance with some embodiments of the invention.

FIG. 4 shows an illustrative diagram of an S-random physical frame shuffler 400 that may provide shuffling portion 216 of FEC encoding process 210 with a suitable shuffling operation. Physical frames from each CB may be written via input line 401 into input buffer 402 of shuffler 400 in normal order from the LDPC encoder of encoding portion 214. The entire buffer may be any suitable length. For example, in accordance with the above given exemplary values, the entire buffer may be 755*49 bits (i.e., 36995 bits) in length, which may include the zero pad bits. Shuffler 400 may permute each CB based on physical frame boundaries using permutation table 403, and may retain the original bit order within each physical frame. FIG. 4 outlines the shuffling process for a first CB. The first physical frame that may be read out of output buffer 404 of shuffler 400 on line 405 is shown to be 26, followed by 16, and ending with physical frame 37. No bit level reordering may be performed within each permuted physical frame.

To ensure a random and even distribution of logic 0 and 1 overlay data bits, original overlay data stream 202 or the output of shuffler 216 may be applied to data scrambling portion 218 of FEC encoding process 210. Scrambling layer 2 data may avoid long strings of logic 1 or 0 bits that may interfere with legacy radio carrier recovery loops.

Figure 5:
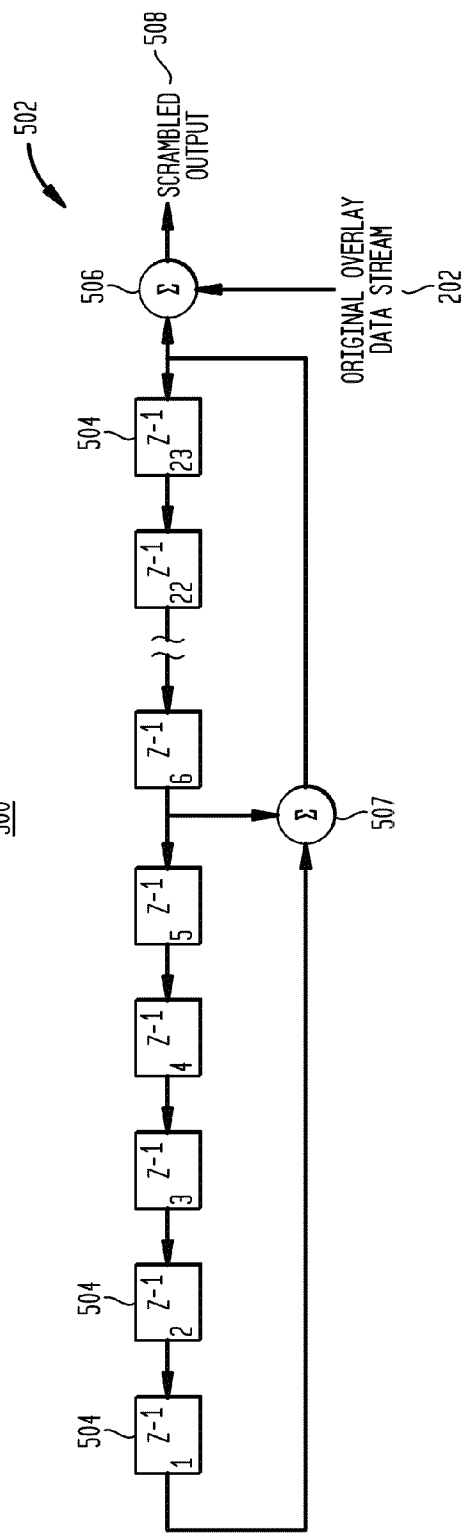
FIG. 5 illustrates an overlay data scrambler, in accordance with some embodiments of the invention.

Scrambling portion 218 may be provided with an overlay data scrambler 500 of FIG. 5. Data may be scrambled by data scrambler 500 via a Maximum Length Shift Register ("MLSR") 502 that may include any suitable number of registers 504. For example, as shown in FIG. 5, MLSR 502 may include 23 shift registers 504 and a feedback tap into an adder 507. At the beginning of each transmission frame, each one of registers 504 may be reset to an all 1's pattern. Any suitable operation 506, such as an XOR operation, for example, may be performed between the output of MLSR 502 and original data stream 202. All addition operations are over galois field length 2 (i.e., GF(2)), and MLSR 502 may be clocked only when overlay modulation is performed. Overlay data scrambler may provide a scrambled output 508.

Figure 6A:
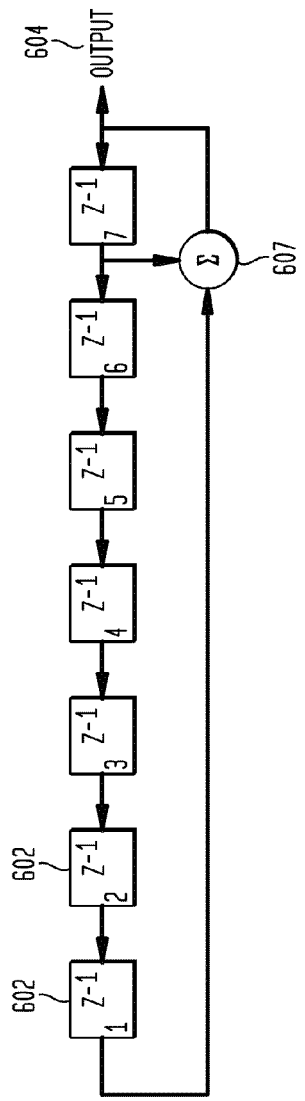
FIGS. 6A and 6B illustrate Overlay Identification Marker ("OIM") bit Maximum Length Shift Register ("MLSR") generation, in accordance with some embodiments of the invention.
Figure 6B:
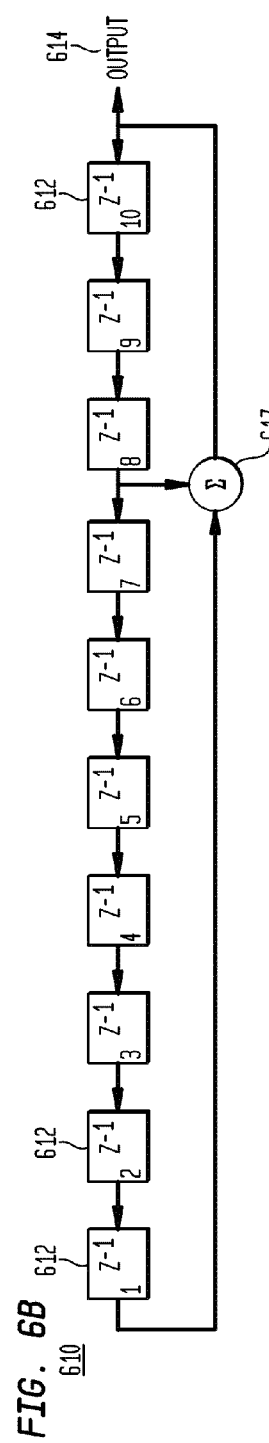
Figure 6C:
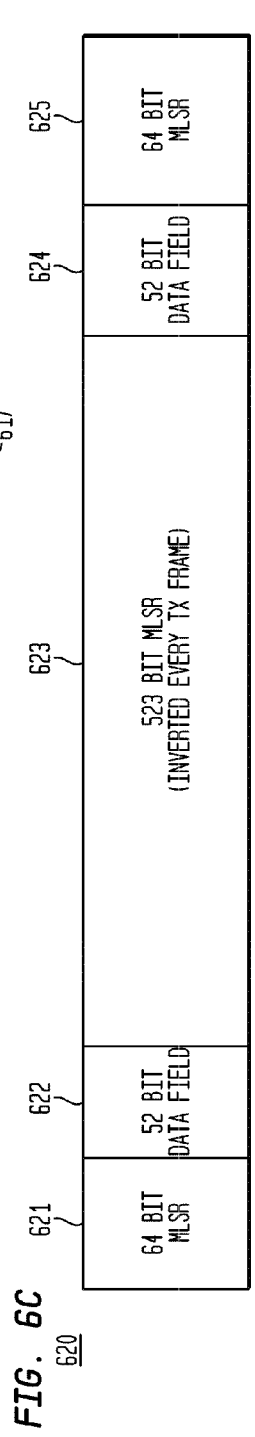
FIG. 6C illustrates an outline of an OIM format, in accordance with some embodiments of the invention.

An Overlay Identification Marker ("OIM") may be inserted in each transmission frame. For example, an OIM may be inserted as the last physical frame of each transmission frame, such as after the last physical frame of the last LDPC code block. As shown in FIG. 2, an OIM insertion line 219 may provide the insertion of OIMs into the data stream through FEC encoding portion 210 of processing portion 200. An OIM may indicate whether or not a legacy signal has been overlay modulated. Additionally, an OIM may convey the amount of overlay offset modulation being used as well as the number of transmission frame delays that may be required for proper Maximal Ratio Combining ("MRC") of the data at a receiver component. An OIM may include any suitable number of sections having any suitable number of bits. For example, in some embodiments and as shown in FIG. 6C, an OIM 620 may include 5 sections, such as a short 64 bit MLSR section repeated twice as first section 621 and last section 625 within OIM 620, a long 523 MLSR middle section 623, and a 52 bit data field section repeated twice within the OIM as second section 622 and fourth section 624 separating the middle section from each of the first and last sections, respectively. The total of all these OIM sections may equal 755 bits (i.e., 2*64+523+2*52).

As mentioned, an OIM may be inserted as the last physical frame of each transmission frame. In some embodiments, the OIM pattern may not be FEC protected or scrambled and may be mapped as encoded data. The first and last sections of an OIM may include the first bits provided by an MLSR. For example, as shown in FIG. 6A, an MLSR 600 may include any suitable number of registers and may generate the first and last sections of an OIM. For example, in accordance with the above given exemplary values, the first and last 64 bits of a 755 bit OIM may be the first 64 bits generated by MLSR 600 of FIG. 6A. MLSR 600 may include any suitable number of shift registers. For example, MLSR 600 may include 7 shift registers 602 and a feedback tap into an adder 607, and each one of registers 602 may be reset to an all 1's pattern after each transmission frame. MLSR 600 may provide an output 604.

The middle section of an OIM may include the first bits provided by an MLSR. For example, as shown in FIG. 6B, an MLSR 610 may include any suitable number of registers and may generate the middle sections of an OIM. For example, in accordance with the above given exemplary values, the middle 523 bits of a 755 bit OIM may be the first 523 bits generated by MLSR 610 of FIG. 6B. MLSR 610 may include any suitable number of registers. For example, MLSR 610 may include 10 shift registers 612 and a feedback tap into an adder 617, and each one of registers 612 may be reset to an all 1's pattern after each transmission frame. MLSR 610 may provide an output 614.

After generation of a complete OIM bit pattern, each MLSR may be reset back to its initial state. The center 523 bit section provided by MLSR 610 may be inverted for the next transmission frame. This bit section may be the only section within the OIM that inverts from one transmission frame to the next. This may add an additional level of unambiguity between time markers. This process may be repeated indefinitely, the non-inverted bit pattern may be identified as "OIM+" and the inverted bit pattern may be identified as "OIM−". If this inverting 523 MLSR bit pattern is not detected by a receiver equipped to handle hierarchically modulated signals (i.e., an "overlay receiver)", the receiver may not include the respective signal in an MRC process. Detection of the OIM in a COFDM receiver path may only be based on the bits in the middle section of the OIM (e.g., the middle 523 bits), because terrestrial repeaters may have the option to replace the first and last sections of the OIM (e.g., the two short 64 bit MLSR sequences) with local station information.

Figure 6D:
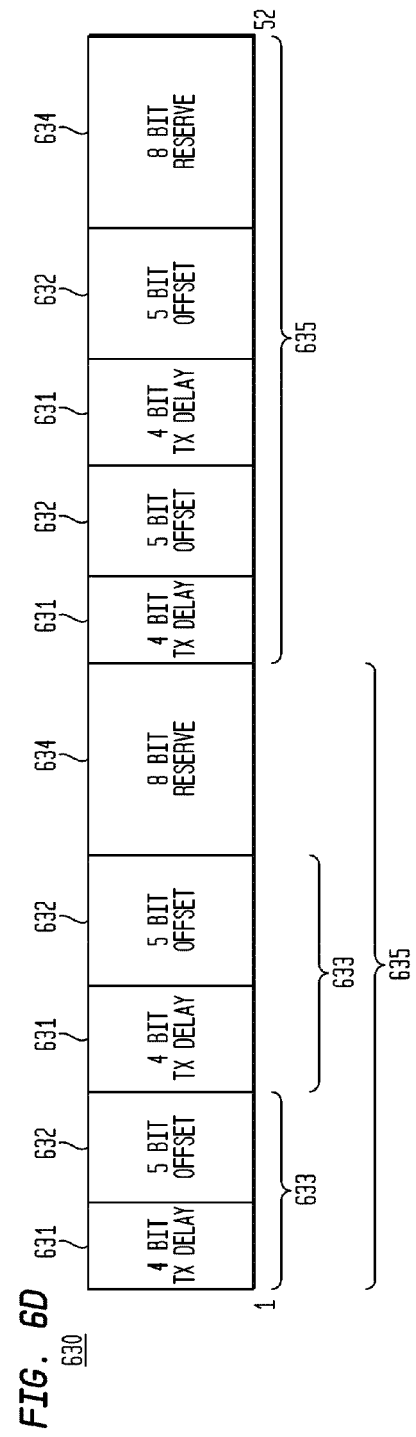
FIG. 6D illustrates the data fields of a portion of the OIM format of FIG. 6C, in accordance with some embodiments of the invention.

Each identical data field section of an OIM may include any suitable type or types of bit portions and sequences of bit portions. In some embodiments, each identical data field section may include two repeating sections. For example, FIG. 6D shows an exemplary format for a 52 bit data field 630. The first 4 bit portion 631 of data field 630 may be a transmission frame delay portion, and may be followed by a 5 bit portion 632 indicating overlay degree offset. This 9 bit sequence 633 may be repeated twice, and may be followed by a portion 634 having 8 reserved bits. This 26 bit pattern 635 may be repeated to complete the 52 bit data field 630.

Each 4 bit transmission frame delay portion 631 may be sent Most Significant Bit ("MSB") first, and may represent the number of transmission frame delays (i.e., in a range of 0 to 15) that may be utilized for proper Maximal Ratio Combining ("MRC") of the data at a receiver component. Each 5 bit overlay offset word 632 may also be sent MSB first, and may represent the TDM angular offset being used in degrees (i.e., in the range of 0 to 31). The COFDM offset will calculate its corresponding amplitude offset as explained below. To signal the receiver that TDM1 may need to be delayed for proper time alignment, the TDM delay pattern may be "10111101", and if TDM2 needs to be delayed at the receiver, then the compliment pattern may be used (i.e., "01000010"). The default delay pattern may be "10111101". When reserved bit portions 634 are not used, they may be set to a reserved pattern, such as, for example, the "10111101" pattern. An exemplary default bit pattern for the 52 bit data field 630 may be, when read from bit location 1 to 52, "1100011111000111110111011100011111100011111-0111101", for example. This pattern represents 12 transmission frame delays, 15 degree offset, and that the reserved bits are not used.

Interleaving portion 220 of FEC encoding portion 210 may provide channel interleaving using any suitable interleaving structure. For example, in some embodiments, interleaving portion 220 may provide channel interleaving using convolutional interleaver structure 700 of FIG. 7. Channel interleaver structure 700 may contain any suitable number of branches 702, such as, for example, 49 branches 702 (i.e., the number of physical frames per LDPC code block). The fundamental interleaver delay depth D of each branch 702 may be any suitable number, such as, for example, a delay depth of D=4. Each D unit of interleaver structure 700 may contain at least 1 overlay physical frame worth of data, which may include any suitable number of bits, such as, for example, 755 bits.

Input branch commutator 703 coupled to data input line 701 of structure 700 and output branch commutator 705 coupled to interleaved data output line 707 of structure 700 may move in synchronization with each other. The branch position of either commutator may equal the physical frame number within each CB. The commutator may remain at each branch 702 for an entire overlay physical frame duration. For example, the first physical frame from each transmission frame may pass through the first branch 702 (i.e., branch "1" of FIG. 7), the second physical frame from each transmission frame may pass through the second branch 702 (i.e., branch "2" of FIG. 7), and so on for all 49 physical frames of the first code block. This process may then be repeated for the first physical frame of the second code block, and then again for each of the 26 code blocks within a transmission frame.

After all of the code blocks (e.g., 26 code blocks having 1274 total physical frames) have been applied to channel interleaver 700, interleaver 700 may pass the entire OIM at the first branch position. After the OIM physical frame is passed, no branch increment may take place. Interleaver 700 may effectively stall at the first branch position to pass the first physical frame of the next transmissions frame CB, after which normal progression of the branch position may continue as described above. The entire process of passing all code blocks, stalling the branch increment at the first branch position for the OIM, and then progressing, may be repeated indefinitely for all subsequent transmission frames.

In some embodiments, each position of channel interleaver 700 may contain the following amount of storage capacity: (j−1)*755*4 bits, where j may be the channel interleaver branch position. The total amount of storage required by channel interleaver 700 may be, for example, 3.551520 Mbits (i.e., 49/2*(49−1)*755*4), and the final output rate of channel interleaver 700 with OIM insertion may be 2.771085 Mbits/second, for example.

Synchronizing portion 222 may synch L1 and L2, such as, for example, at the transmission boundary points.

Transport to Uplink Modulators:

The overlay FEC processing of FEC encoding portion 210 of FIG. 2 may be handled by the Overlay FEC ("OFEC") elements of the broadcast and transmission infrastructure of the SDARS system. The output of the OFEC may be a data stream at any suitable rate. For example, in some embodiments, the output of the OFEC may be a data stream at 3.7584 Mbits/second, which may be half the data rate of the legacy data stream (e.g., a legacy data rate of 7.5168 Mbits/second) as generated by the SPACE elements (e.g., SPACE elements 103 of FIG. 1A and element 203 of FIG. 2). Such a 1:2 ratio of data rates between OFEC's overlay data stream and SPACE's legacy data stream may be critical in maintaining bit stream alignment across the two streams.

Figure 8:
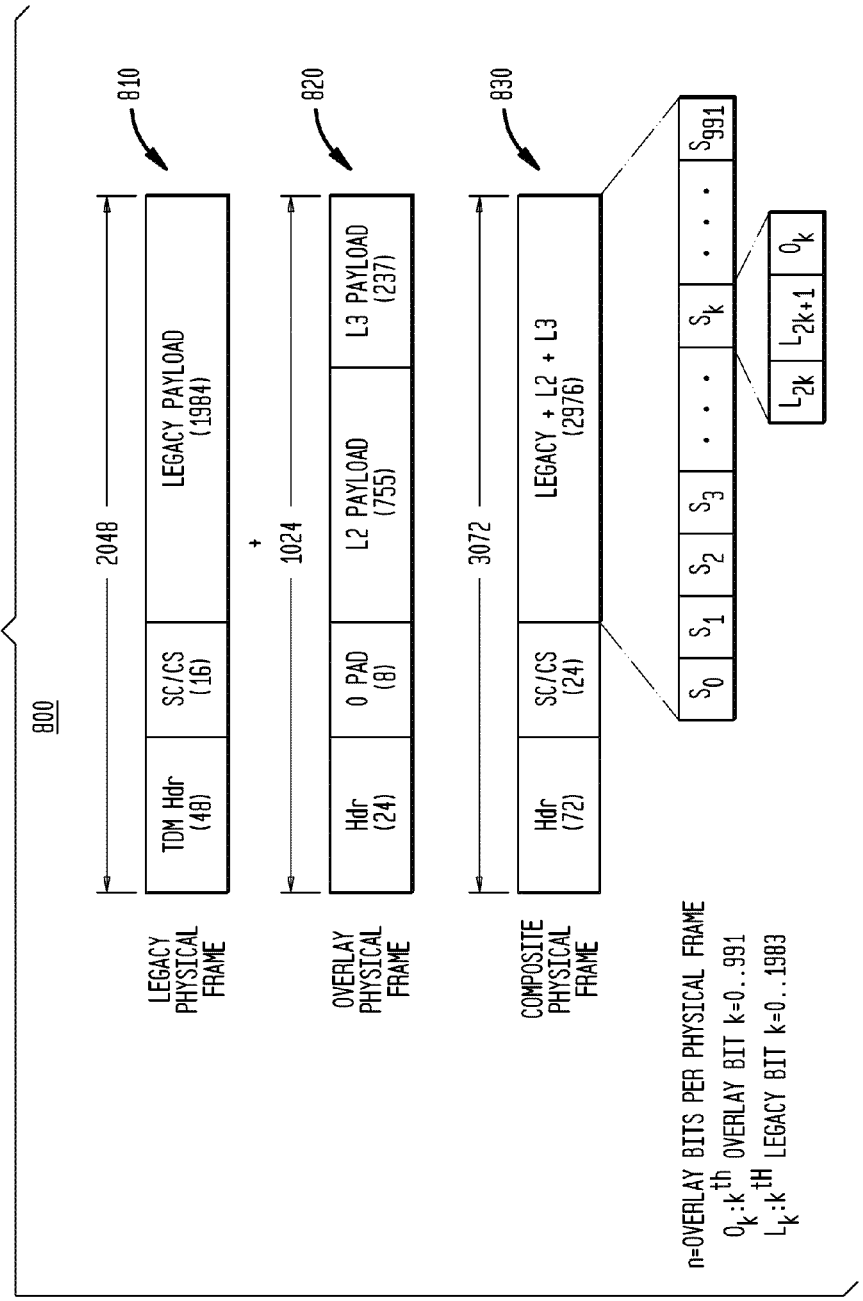
FIG. 8 illustrates the format of various data streams, in accordance with some embodiments of the invention.

FIG. 8 shows exemplary formats 800 of the data streams generated by the SPACE and OFEC elements (i.e., legacy physical frame format 810 and overlay physical frame format 820), as well as a composite physical frame format 830.

The outputs of the OFEC and SPACE elements may be fed to a Composite Multiplexer ("CMUX"), such as CMUXs 108 of FIG. 1A. The CMUX may receive two overlay streams from the OFEC elements, each at any suitable rate, such as 3.7584 Mbits/second, and the CMUX may also receive two legacy streams from the SPACE elements, each at any suitable rate, such as 7.5168 Mbits/second. Next, the CMUX may align the two legacy streams at transmission frame boundaries and select one of them based on either availability or manual-override provisioning. The selected legacy bit stream may be denoted as L0. The CMUX may also align the two overlay streams at transmission frame boundaries and select one based on either availability or manual override provisioning. The selected overlay bit stream may be denoted as O0. Next, the CMUX may combine selected bit streams L0 and O0 to generate a composite stream containing sequences of two legacy bits followed by one overlay bit. This composite bit stream may be denoted as C0. The CMUX may reposition a marker (e.g., the 16-second marker) in composite bit stream C0 such that it may be aligned with the 1 pulse per 16 second ("1pp16s") signal fed to the CMUX. The 1pp16s, or any suitable equivalent, may provide transmission frame alignment at each terrestrial repeater with the satellite signals. Finally, the CMUX may maintain physical frame and transmission frame boundaries as well as the relative position of the 16-second marker in the composite bit stream C0 output even when legacy or overlay feeds are switched.

The frame format of composite stream C0 is shown by frame 830 of FIG. 8. It may be noted that the CMUX may transmit the entire 992 overlay bits (e.g., 755 L2+237 additional (e.g., Layer 3 bits)) that it receives from the OFEC elements. The output of the CMUX may be fed to one or more Overlay Modulator ("OMOD") elements for generating the QPSK signal for the satellite TDM segments and the VSAT Modulator ("VMOD") for feeding the terrestrial sites.

Figure 8A:
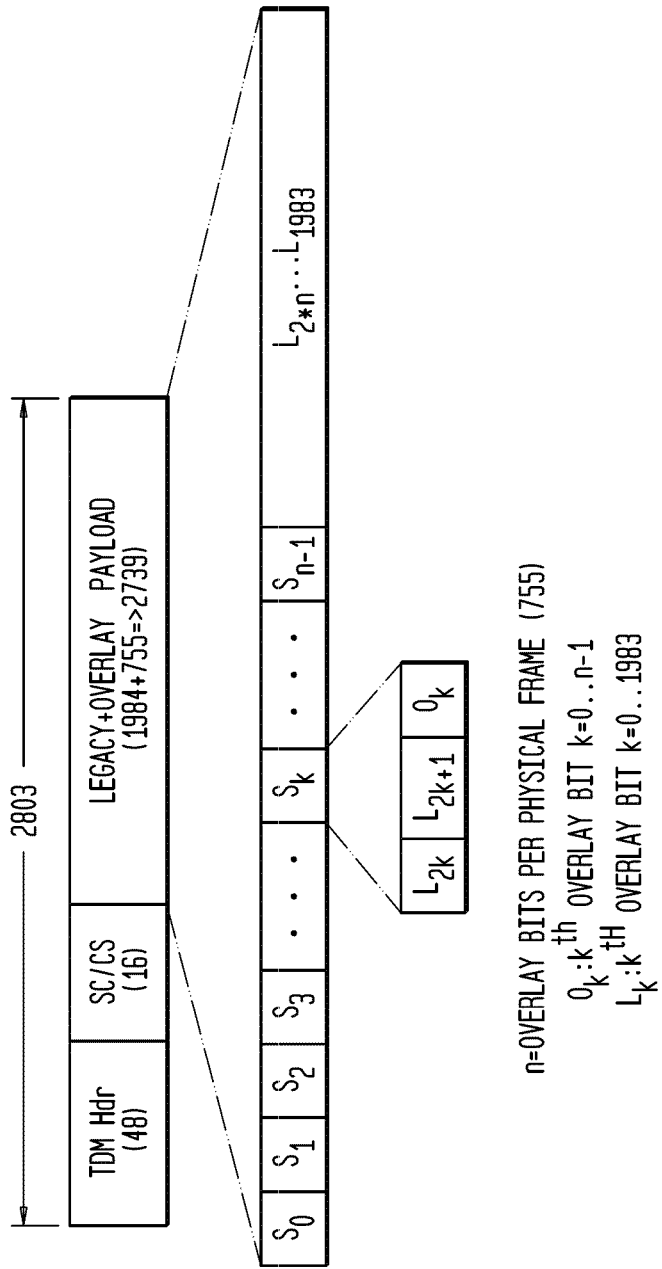
FIG. 8A illustrates an exemplary uplink data format, in accordance with some embodiments of the invention.
Figure 9:
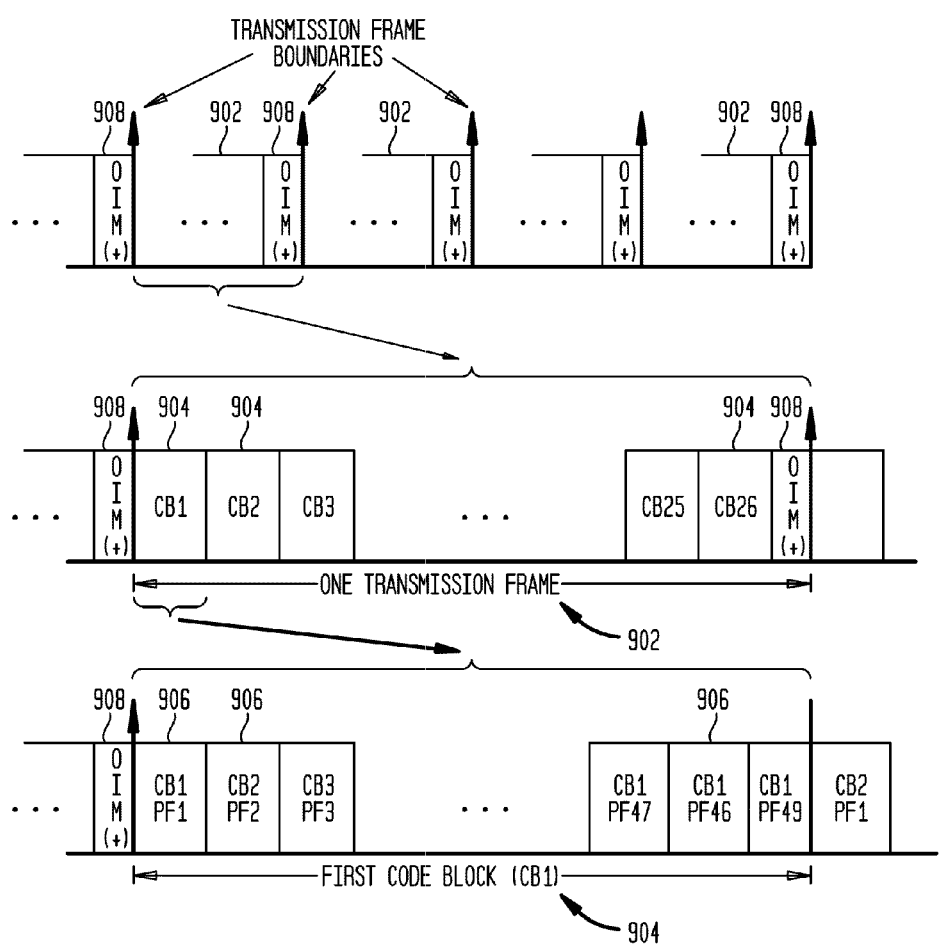
FIG. 9 illustrates overlay framing, in accordance with some embodiments of the invention.

FIG. 8A shows an exemplary VMOD uplink payload packet structure 850. From the composite physical frame, the VMOD may strip out all dummy overlay CAZAC and service channel bits, which may result in a duplicate of the legacy bit stream header (TDM Hdr) and service channel (SC)/cluster sync(CS) bits. The TDM header may have 48 bits and the SC/CS portion may have 16 bits. The payload portion may have 2739 bits and has two sections. The first section ($S_0 \ldots S_{n-1}$) may contain n triplets (e.g., n=755 triplets), and each triplet may include two legacy bits ($L_{2k}$, $L_{2k+1}$) and one overlay bit ($O_k$). There may be a total of 755*3=2265 bits in the first section. The second section ($L_{2*n} \ldots L_{1983}$) may include the remaining (1984−2*755)=474 legacy bits. The total VSAT payload physical frame length may be 48+16+2739=2803 bits. These bits may subsequently be wrapped into a DVB-S frame structure for FEC encoding and transmission to remote VSAT sites.

Both VMOD and OMOD elements may strip out dummy Constant Amplitude Zero Auto-Correlation ("CAZAC") header bits. The OMOD elements can be configured to utilize both L2 and additional overlay layers or just L2 bits for the purpose of overlay modulation. The VMOD elements may use the L2 bits only and may strip out the additional overlay bits prior to DVB-S FEC processing and modulation.

Physical Layer Modulation and Overlay Framing:

To ensure robust receiver synchronization, overlay transmission frames may be aligned with the legacy transmission frame boundary. Each transmission frame may contain the same amount of interleaved code blocks (e.g., BCH and LDPC code blocks). As shown by overlay framing format 900 in FIG. 9, there may be 26 code blocks 904 per each transmission frame 902, and there may be 49 physical frames 906 per each code block 904. Each transmission frame 902 may use its last physical frame 906 as an Overlay Identification Marker ("OIM") 908.

The distribution of CB 904 data within a physical frame 906 may be distributed contiguously over each TDM physical frame 906. In the TDM case, the CAZAC and SERVICE channel data may not be overlay modulated. In the COFDM case, a non-contiguous overlay assignment pattern may used.

Legacy transmission frames may contain 1275 physical frames, for example. In some embodiments, the number of legacy symbols within a TDM physical frame may contain 1024 QPSK symbols, while a COFDM physical frame may contain 1000 symbols. For example, in one transmission frame there may be 1,305,650 TDM QPSK symbols (i.e., 1275*1024 symbols) and 1,275,000 COFDM data carriers (i.e., 1275*1000 data carriers). Using these exemplary values, the required overlay bandwidth may be reconciled with respect to the legacy bandwidth on a transmission frame basis by the information in the following table:

|  | TDM | COFDM |
| --- | --- | --- |
| Un-modulated CAZAC symbols: | 30600 (24*1275) | N/A |
| Un-modulated Service channel symbols: | 10200 (8*1275=) | 10200 (8*1275) |
| Overlay bits (BCH + LDPC + zero padding): | 961870 (755*49*26) | 961870 (755*49*26) |
| Overlay OIM: | 755 | 755 |
| Un-modulated COFDM bins (Ampl. Refs.): | N/A | 302175 (237*1275) |
| Unused TDM capacity (to rate match COFDM): | 302175 (237*1275) | N/A |
|  | 1305600 | 1275000 |

Notice the sum of each column matches exactly the number of symbols within each signals transmission frame. The unused TDM capacity may be required due to the COFDM pilot utilization. This unused capacity may be used, for example, for future layer 3 services that may only be available on the TDM satellite signals.

In some embodiments, the number of bits per transmission frame out of various stages of the FEC encoding process of FIG. 2, for example, may be as follows: overlay L2 data 202 may be 318656 bits; after BCH encoder 212 may be 323024 bits; after LDPC encoder 214 may be 961844 bits; after zero padding at zero pad insertion line 215 may be 961870 bits; and after OIM insertion at OIM insertion line 219 may be 962625 bits. Furthermore, according to the exemplary values used throughout portions of this disclosure (e.g., where a transmission frame rate may be 2.878676471 tx/second), the data rate out of various stages of the FEC encoding process of FIG. 2 may be as follows: overlay information 202 rate may be 910.3075295 Kbits/second; BCH encoder 212 output rate may be 929.8815884 Kbits/second; LDPC encoder 214 output rate may be 2.768837692 Mbits/second; frame shuffler

216 output rate may be 2.768912537 Mbits/second; and final overlay output rate post OIM insertion at insertion line 219 may be 2.771085938 Mbits/second, for example. The overlay coding rate may be 0.331028178 (i.e., (12256/12424)* (12424/36995)*(1274/1275)), and the raw unused TDM capacity may be about 869,864 legacy symbols/second (i.e., 302,175*2.878676471).

As mentioned with respect to FIG. 1, the three signals to be broadcast over SDARS system 10 may be transmitted using two or more different modulation schemes. For example, the first and second signals may be transmitted via satellites 32 and 34 to receiver 50 over paths 42 and 44 using a TDM mode, as shown by TDM1 signal path 292 and TDM2 signal path 294 of FIG. 2, while the third signal may be transmitted via terrestrial repeater 36 to receiver 50 over path 46 using a COFDM mode, as shown by COFDM signal path 296 of FIG. 2.

The combination of three transmission paths using both TDM and COFDM modes may provide for time, frequency, and space diversity within the SDARS system. For example, COFDM signal path 296 and TDM2 signal path 294 may be delayed with respect to TDM1 signal path 292 within processing portion 200 to provide time diversity. As shown in FIG. 2, for example, the time diversity incorporated into the parallel bit streams for TDM2 signal path 294 by delay elements 254 and 264 may match the amount of time diversity incorporated into the parallel bit streams for COFDM signal path 296 by delay elements 256 and 266. In some embodiments, this time diversity may range from 0 to 13 transmission frames. For example, a current transmission system may utilize 12 transmission frames of delay, which may yield approximately 4 seconds of time diversity (i.e., 4.16868 seconds). Cluster concepts may not exist in an overlay system, so an overlay receiver may delay the entire TDM1 signal path 292 at the receiver-end of the system by 0 to 13 transmission frames. The transmission frame delay used for the overlay data may be conveyed to the overlay receivers by decoding the OIM message.

To minimize degradation to hierarchically modulated signals at legacy receivers, complimentary keying may be used between the two TDM satellite signals. For example, logic 0 and logic 1 overlay data bits may be inverted between TDM1 signal path 292 and TDM2 signal paths 294. Bit invert 274 may invert every overlay bit it receives (e.g., including uncoded, unscrambled OIM bits) before TDM2 modulator 284 may map TDM2 L1 data and TDM2 L2 data to its pseudo-8PSK constellation.

Figure 10:
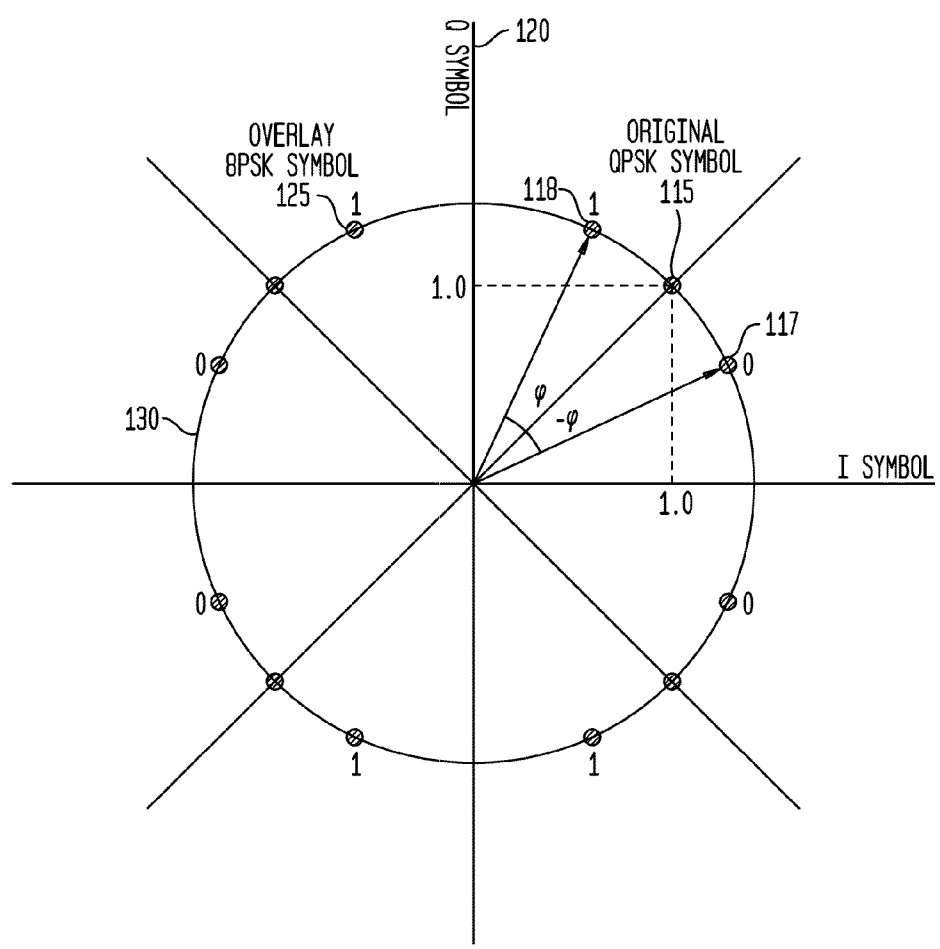
FIG. 10 illustrates an exemplary angular offset over a Quadrature Phase Shift Keying ("QPSK") hierarchical modulation scheme, in accordance with some embodiments of the invention.

Overlay information may be modulated onto a L1 legacy TDM symbol stream by applying a programmable angular offset to legacy QPSK symbols, forming a new constellation similar to an 8PSK constellation, as is shown in FIG. 10.

For example, given a complex legacy symbol $L=L_i+j*L_q$, a transmitted overlay symbol O can be expressed as $O=(L_i+j*L_q)*(\cos\alpha\pm j*\sin\alpha)$, where the sign in the second component may represent the value of the overlay bit and can thus determine, for example, the direction of rotation of the ultimately transmitted I,Q symbol relative to the original, or legacy, QPSK symbol.

As noted, this technique is illustrated in FIG. 10. FIG. 10 illustrates an exemplary mapping of overlay data onto a legacy QPSK symbol to form a new 8PSK-type constellation. In FIG. 10, unit circle 130 is depicted, with real axis 110 and imaginary axis 120. With reference to FIG. 10, the original or first modulation layer QPSK symbols are shown at co-ordinates (1,1), (1,−1), (−1,−1), and (−1,1) (i.e., at angles that are multiples of 45 degrees along the unit circle), in each of quadrants I, II, III, and IV, respectively. Imposing a second layer of modulation on these legacy symbols may transform each of these QPSK symbols to one of two possible overlay 8PSK symbols 125, and also symbols 117 and 118, which are shown as the two points at an angle $+/-\phi$ from each original QPSK symbol 115, making a total of eight possible overlay 8PSK symbols. Thus, for example, rotating a QPSK symbol by an additional angle $\phi$ can encode an overlay 1, and rotating the same QPSK symbol by an additional angle $-\phi$ can encode an overlay 0, as is shown in quadrants I and III. Alternatively, an overlay 0 and 1 can be mapped to the reverse phase shifts, where rotating a QPSK symbol by an additional angle $\phi$ can encode an overlay 0, and rotating the same QPSK symbol by an additional angle $-\phi$ can encode an overlay 1, as shown in quadrants II and IV.

In FIG. 10, a Gray coding scheme is utilized. Thus, in quadrants I and III, an overlay 1 may add an angle $\phi$ to the original QPSK symbol, and an overlay 0 may subtract the angle $\phi$ from the original QPSK symbol, and, in quadrants II and IV, an overlay 0 may add the angle $\phi$ and an overlay 1 may subtract the angle $\phi$. A positive rotation may provide a counterclockwise rotation. This may be done to improve accuracy, so that if an overlay 1 bit from a neighboring quadrant spills over into the adjacent one, it may still be read as a 1, so all pie slices with overlay 1 may be set adjacent to each other, and all pie slices with overlay 0 may be set adjacent to each other. In exemplary embodiments, such a Gray coding scheme can be used, and in alternate exemplary embodiments, it can, if so desired, not be used. In general, a Gray coding scheme may reduce the error in the overlay bit to one-half what it otherwise would be without the adjacencies.

Thus, for example, with respect to FIG. 1, the original legacy symbol 115 in quadrant I can be transformed to either of two 8PSK overlay symbols 117 and 118, where 117 may be sent if the overlay bit is a 0, and 118 may be sent if the overlay bit is a 1.

In exemplary embodiments, for overlaying information onto QPSK symbols to generate a pseudo 8PSK coding scheme, the angle $\phi$ can be set to any value from 0 to 22.5 degrees. With $\phi$ greater than 22.5 degrees there could begin to be overlap between received 8PSK symbols, for example, due to the fact that most real channels can have random phase distortions, which may not be desired. In alternate exemplary embodiments, if such overlap is not a concern, such as in channels with very low noise or a known predictable (i.e., non-random) noise signature that can be reliably removed, $\phi$ can have any reasonable range, such as 0 to 40 degrees, and more particularly, such as 0 to 22.5 degrees, and still avoid overlap.

The angular offset angle used for the overlay data may be conveyed to overlay receivers (e.g., a receiver 50 of FIG. 1 that is equipped to handle hierarchical modulation) by decoding the OIM message.

As the new 8PSK type overlay modulated symbols may remain in their original quadrant, the information from the original legacy QPSK symbols can be preserved. However, under an overlay modulation scheme, while the legacy decoders in legacy receivers (e.g., a receiver 50 of FIG. 1 that is not configured to handle hierarchical modulation techniques) may expect a standard QPSK signal, what they may actually see is the random angular offset of the overlay modulation as an unnatural noise enhancement. Under low Signal-to-Noise Ratio ("SNR") conditions, the angular offsets can get lost in the noise, but stronger signals may see an unfair bias to the internal error calculations of the legacy decoder. This unfair bias can hurt performance and synchronization by allowing adaptive algorithms, such as, for example, equalizers, digital gain control, and carrier recovery, to process the invalid error signal. If the legacy decoder synchronization is relied on for retrieval of the overlay data as well, both services can suffer in performance.

A second degradation can also be seen in the performance of the legacy service by allowing the overlay modulated signal to pass through to the Forward Error Correction stage. Therefore, in exemplary embodiments, the angular offset may be removed from the signal prior to inputting a received symbol to Synchronization and Forward Error Correction stages of a legacy decoder.

To remove the offset created by the overlay modulation, a decoder might have to know exactly what was transmitted, which may not be possible. Instead, in exemplary embodiments, a decoder can make a rough guess by hard-slicing the overlay modulated signal to the appropriate pie slice within the received quadrant, thereby indicating in which direction the overlay offset may have been added. For example, with reference to FIG. 10 and the overlay modulation scheme shown therein, assuming the original QPSK symbol was original QPSK symbol 115 with an overlay angular change, and it is necessary to determine whether the overlay symbol that was sent was 118, with an angular increase of $\phi$, or 117, with an angular decrease of $\phi$. By slicing quadrant I by the line I=Q (i.e., by the line running form the origin through original QPSK symbol 115), a good rough guess is that if the received overlay symbol is to the right of that line it has a 0 overlay bit, and if the received overlay symbol is to the left of that line, it has a 1 overlay bit. With knowledge of the angle used in transmitting the overlay signal, any received overlay symbol can then be de-rotated by the same amount, thus removing the effect of the overlay modulation. Any error vector calculated from such a de-rotated symbol may thus more accurately represent the true error of the received symbol.

Figure 11:
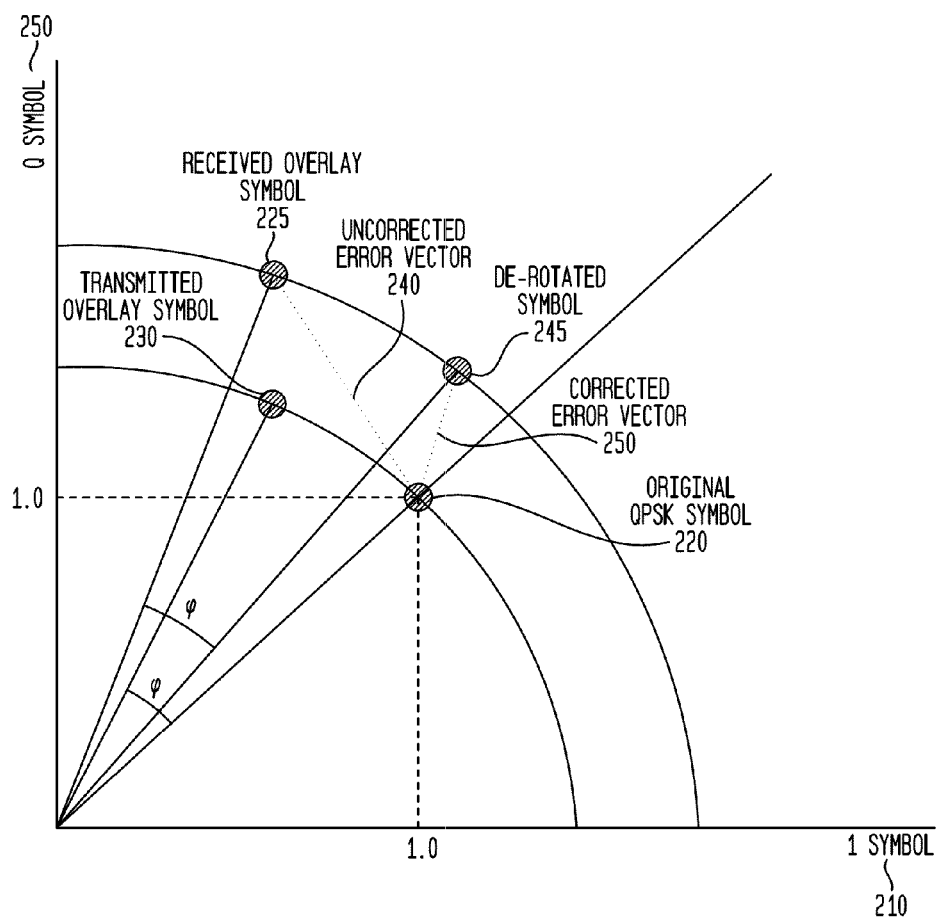
FIG. 11 illustrates overlay offset compensation, in accordance with some embodiments of the invention.
Figure 12:
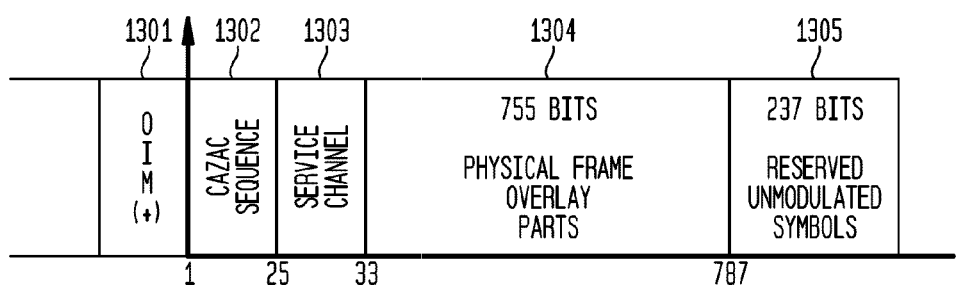
FIG. 12 illustrates overlay framing, in accordance with some embodiments of the invention.

FIG. 11 illustrates such de-rotation of a received symbol according to an exemplary embodiment. With reference to FIG. 11, quadrant I of the I, Q plot of FIG. 10 is shown, with I Symbol axis 1210 and Q Symbol axis 1250. An exemplary Original QPSK Symbol 1220 is shown, and the transmitted version of this symbol after overlay modulation being Transmitted Overlay Symbol 1230 is shown (e.g., by adding an angle $\phi$ to its phase). The angle $\phi$ between Original QPSK Symbol 1220 and Transmitted Overlay Symbol 1230 is shown with one angle sign, closest to the origin of the depicted I, Q plot. The actually received version of this symbol, Received Overlay Symbol 1225, is also shown and has a larger amplitude than, and a phase distortion relative to, Transmitted Overlay Symbol 1230, and thus it is no longer on the unit circle. These changes to amplitude and phase of the transmitted symbol may be introduced by noise in the channel. After subtracting the known angle $\phi$ from the phase of Received Overlay Symbol 1225, a de-rotated symbol results, such as De-Rotated Symbol 1245. The angle $\phi$ between Received Overlay Symbol 1225 and De-Rotated Symbol 1245 is shown with two angle signs. Thus, in exemplary embodiments, the error vector seen by the decoder after de-rotation, Corrected Error Vector 1250, may be significantly smaller than that of Uncorrected Error Vector 1240, which may be the difference between Original QPSK Symbol 1220 and Received Overlay Symbol 1225.

It is noted with reference to FIG. 11 that Corrected Error Vector 1250 may match the error with respect to the transmitted signal (i.e., the error between Received Overlay Symbol 1225 and Transmitted Overlay Symbol 1230, which is not shown in FIG. 11, but is easily discernable). Of course this method may not be absolute, and symbols received outside the quadrant that they were actually transmitted in may be de-rotated in the wrong direction. While such improperly rotated symbols may result in a more favorable than expected error vector, this may have negligible effects compared to the much larger percentage of symbols that are received within their originally transmitted quadrant and that are properly de-rotated.

It is noted that the actual performance gain realized due to overlay offset compensation may be dependent upon the actual algorithms that take advantage of the compensation. Thus, some algorithms may see a great improvement, while others may see no improvement at all. In exemplary embodiments, the simplest solution to compensating for overlay modulation is provided without needing to modify any proven algorithms within legacy demodulator designs. The methods of exemplary embodiments thus allow for essentially any offset angle used in an overlay modulation scheme to have minimal effect on signal acquisition and performance.

Physical and transmission frame boundaries of the overlay system may match that of the legacy system. At the start of each overlay physical frame, the overlay data may be modulated onto the legacy QPSK symbols as outlined in FIG. 12. The starting location of the 1st overlay bit shall correspond to the $33^{rd}$ QPSK legacy symbol. The $755^{th}$ overlay bit shall correspond to the $787^{th}$ QPSK legacy symbol. A number of reserved unmodulated symbols (e.g., 237) at portion 1305 may be provided after the $755^{th}$ overlay bit and may be used to rate match a COFDM signal.

Overlay data may be modulated onto the legacy COFDM symbol stream by offsetting an original COFDM pi/4 Differential Quadrature Phase Shift Keying ("DQPSK") symbol amplitude. In some embodiments, the amplitude offset $\alpha$, with respect to the original DQPSK amplitude, may be controlled by the equation $\alpha=\sqrt{2.0}*\sin(\phi)$, where $\phi$ may be the TDM angular offset in degrees. For example, $\alpha$ may range from +/−0 to 0.5, in 0.025 amplitude increments, for example. The distance from the origin to the overlay symbol location may have the same radial angle as the original pi/4 DQPSK symbols with no angular modulation.

Figure 13:
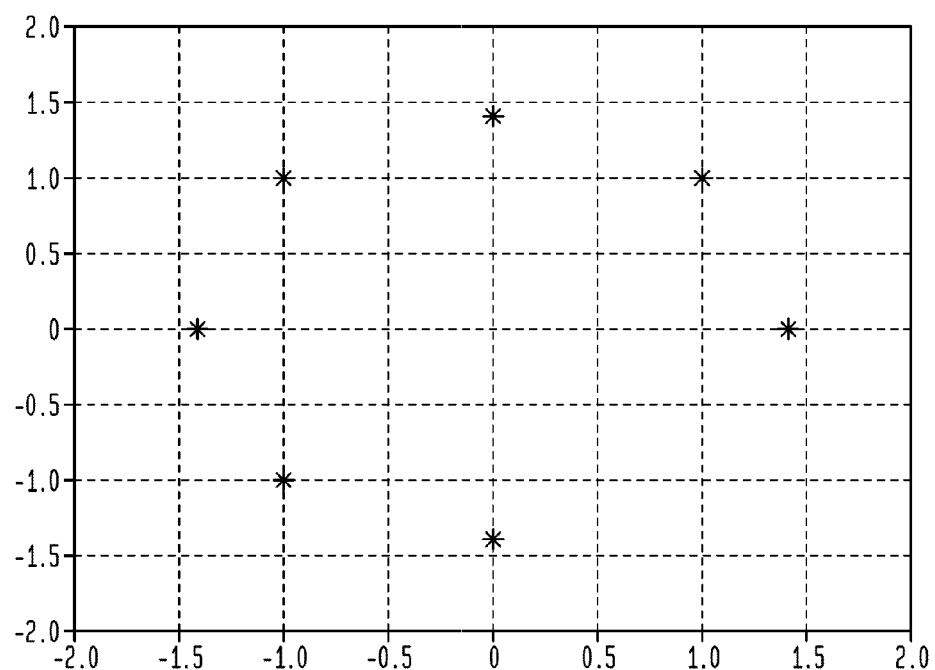
FIG. 13 illustrates an exemplary constellation resulting from single carrier QPSK modulation, such as found in legacy bit streams, in accordance with some embodiments of the invention.

FIG. 13 shows an exemplary DQPSK constellation. The constellation shown in FIG. 13 may have a nominal radial distance of 1.414, for example. DQPSK may refer to the procedure of generating a transmitted QPSK symbol by calculating the phase difference between the current and the preceding QPSK symbols. In such a modulation scheme, all information (i.e., two binary bits per symbol) may be conveyed by the difference in phase across frequency bins. Generally, a starting bin, known as a pilot bin, may be used as a reference and all additional bins within a group may be differentially modulated based on the starting phase of the pilot bin and its adjacent data bin.

For example, one current SDARS modulation scheme utilizes two pilot bins, one starting at a band edge, wherein the first 500 data bins following the pilot bin are differentially modulated. A null bin follows these 500 data bins, which is used to avoid carrier leakage into active data bins. After the null bin, a second pilot bin is used as a reference phase for a second group of 500 active data bins following said second pilot bin. The combination of 1000 active data bins, two pilot bins, and one null bin are used to load a Fast Fourier Transform ("FFT") symbol. This data can then be placed into an inverse FFT engine, appended with a guard interval, and radio frequency ("RF") processed for transmission.

Such a differential phase encoding technique may be viewed mathematically as follows:

$Z_0=(1/\sqrt{2})+j*(1/\sqrt{2})$;

$Z_1=Y_0*Z_0$; and $Z_2=Y_1*Z_1$, where $Y_i(n)=[+/-1, +/-j]$, where i is the FFT bin number, where n is an index for the FFT points in a bin, and where j is the square root of −1, the basis of imaginary numbers. Moreover, it is noted that in the above equations $Z_0$ is a pilot symbol, which carries no information. It may only provide a starting phase for the modulation process. If applied to a data set that consists of +/−1 unity symbols, such modulation may result in an exemplary symbol constellation as is depicted in FIG. 13. After modulation and transmission, a receiver can then accept these symbols and can, for example, perform an differential decoding process (e.g., similar to the differential encoding process described above) to demap the data symbols into normal QPSK constellations.

In exemplary embodiments, an addition to such a first layer modulation scheme to encode additional overlay information onto existing symbols generated by such a first layer of modulation can be done in a manner that may not harm reception by existing receivers (e.g., an existing legacy receiver that is only designed or configured to decode legacy layer 1 data and not hierarchically modulated data). That is, the addition of such overlay information may be done such that these legacy receivers may not experience much difficulty due to the presence of the overlay modulation on the symbols it receives. Thus, in exemplary embodiments, the additional information can be carried on the amplitude of each data bin.

Figure 16:
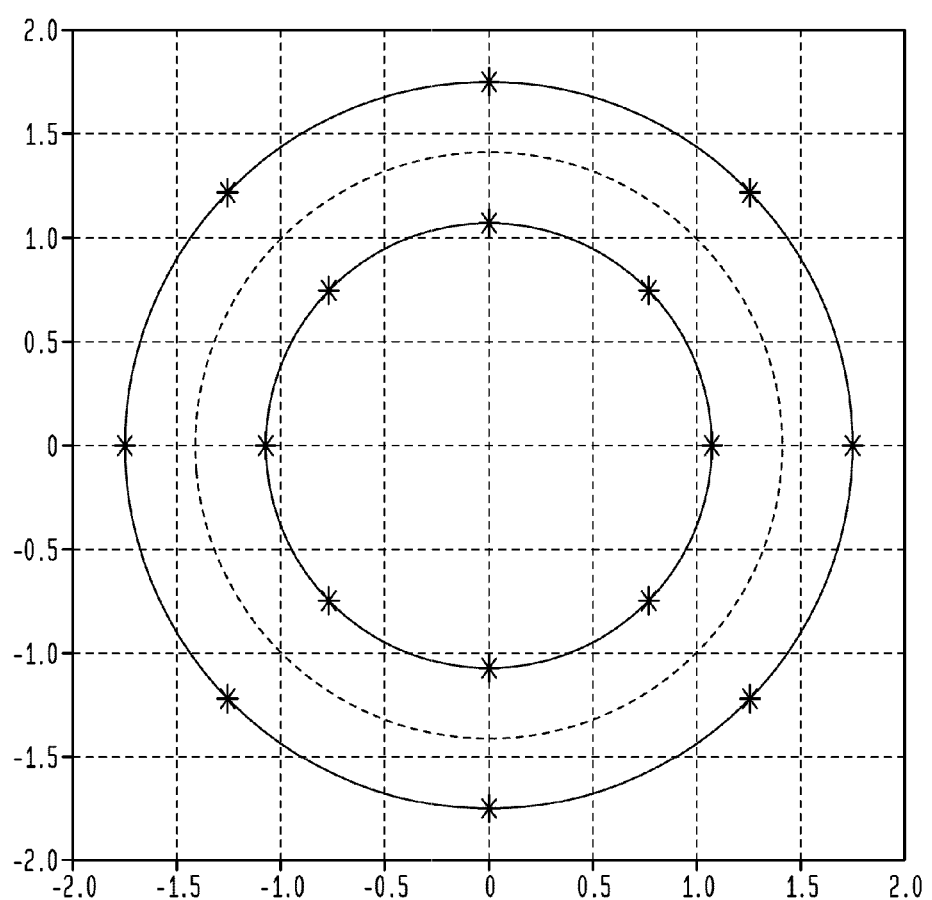
FIG. 16 illustrates an exemplary set of data rings, and a unit circle shown as a dotted line, resulting from an exemplary modulation scheme, in accordance with some embodiments of the invention.

An overlay modulation process can start as described above, but the amplitude of each legacy I/Q symbol can then be changed in accordance with an overlay modulation bit. For example, if the additional overlay information is a logical 1, then the amplitude of the I/Q pair for a particular bin can be increased from its nominal value of 1 to a value 1+D. Conversely, a logic 0 can be transmitted in the amplitude of each I/Q pair by decreasing the amplitude to a value 1−C. It is noted that the nominal value of 1 for legacy amplitude is exemplary only, and in exemplary embodiments, nominal first layer symbol amplitude can be increased so as to provide more room for amplitude offsets (i.e., the range 1−C to 1+D). In exemplary embodiments, it may be convenient to set C equal to D, or approximately equal to D, so as to have two rings of received symbols that are equidistant, or approximately equidistant, from a ring of legacy symbols, as is shown in FIG. 16. This can, for example, simplify the detection of the overlay information. In alternate exemplary embodiments, C may not necessarily be equal to D. Such an exemplary modulation scheme may allow for each active data bin to be modulated and, thus, in the example described above, allows for an additional 1000 data bits per FFT symbol.

Thus, for example, in exemplary embodiments, the FFT symbol rate can be approximately 4 kHz per second, thus allowing for a total of 4 million additional data bits per second.

Figure 14:
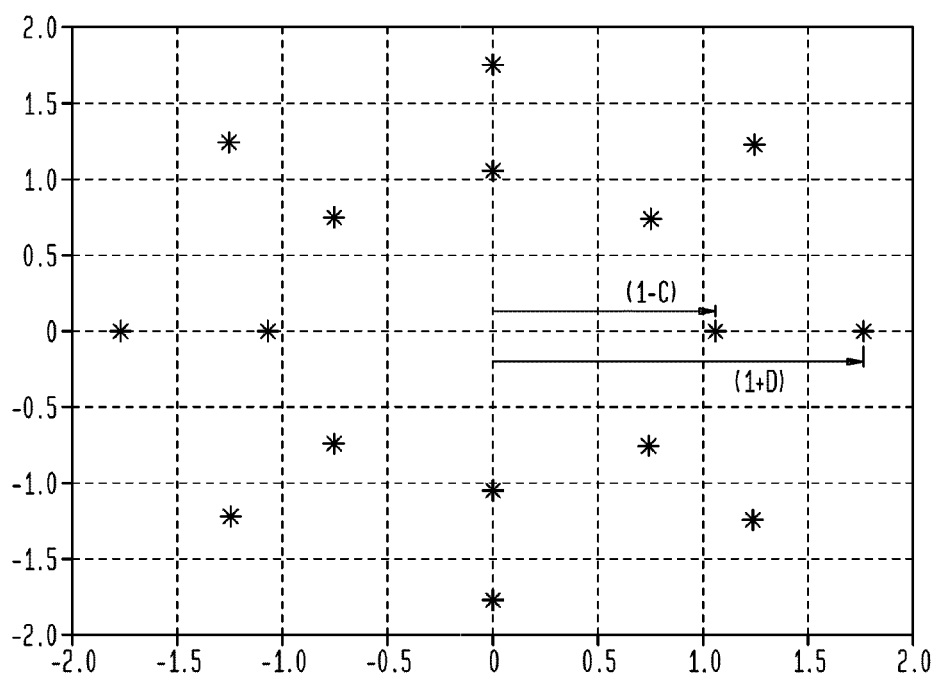
FIG. 14 illustrates an exemplary constellation resulting from an exemplary modulation scheme of the symbols shown in FIG. 13, in accordance with some embodiments of the invention.

In exemplary embodiments, a transmitted overlay modulated constellation can appear as is illustrated in FIG. 14, where there is now a ring of DQPSK symbols at an amplitude of 1−C, and a second ring of DQPSK symbols at an amplitude of 1+D, and where the amplitude of each of the original legacy symbols was nominally 1.414.

In exemplary embodiments, the average power transmitted using an overlay modulation scheme can, for example, be essentially the same as a legacy system. In this approach a receiver's Automatic Gain Control ("AGC") may not see any adverse effects.

Thus, to achieve this, the average power from the new constellation can be set to equal unity. In exemplary embodiments, independently controlling C and D can allow for this as well as for possible additional system optimization procedures in the future. Thus, at a receiver, in exemplary embodiments, a channel equalization technique can, for example, be used that can be based on a unit power transmitted constellation. To maintain unit power, the following equation may hold: $[(1-C)^2+(1+D)^2]/(2*2)=1$.

In exemplary embodiments, where C may not be desired to be approximately equal to D, one possible candidate offset pair to implement this condition can be, for example, C=0.2928 and D=0.8708. The resulting constellation can thus average to unit power. Alternately, in some exemplary embodiments, as noted, setting C equal to D, or substantially equal to D, can be preferred, and average power can be allowed to exceed unit power.

In exemplary embodiments, an amplitude offset can be applied either before or after the differential modulation process. To ensure minimal impact to current legacy receivers, optimal performance can be obtained if overlay amplitude changes are applied after the differential modulation process used to generate the legacy symbols. The effect on the received signal to the legacy receivers and next generation receivers (i.e., those equipped to detect both a legacy signal and an overlay signal) may be to appear as if the signal has undergone a multipath distortion. This can, for example, take away some ability of such legacy receivers to withstand multipath distortion. Any resulting degradation cannot precisely be predicted but is expected to be small because the constellation will see destructive interference half of the time and constructive interference the remainder of the time. The overall effect can thus be expected to average out within, for example, a trellis decoder.

At the receiver, legacy and future generation radios that recover the fundamental signal may process the COFDM signal with no change. As discussed above, to the legacy decoding process the received signal may appear to have multipath distortion induced on the fundamental signal. Layer 2 data (i.e., overlay data) modulation may need to extract this additional information. Because, in exemplary embodiments, all layer 2 modulation may be encoded in the amplitude of the signal, an additional processing step may thus be required.

Figure 15:
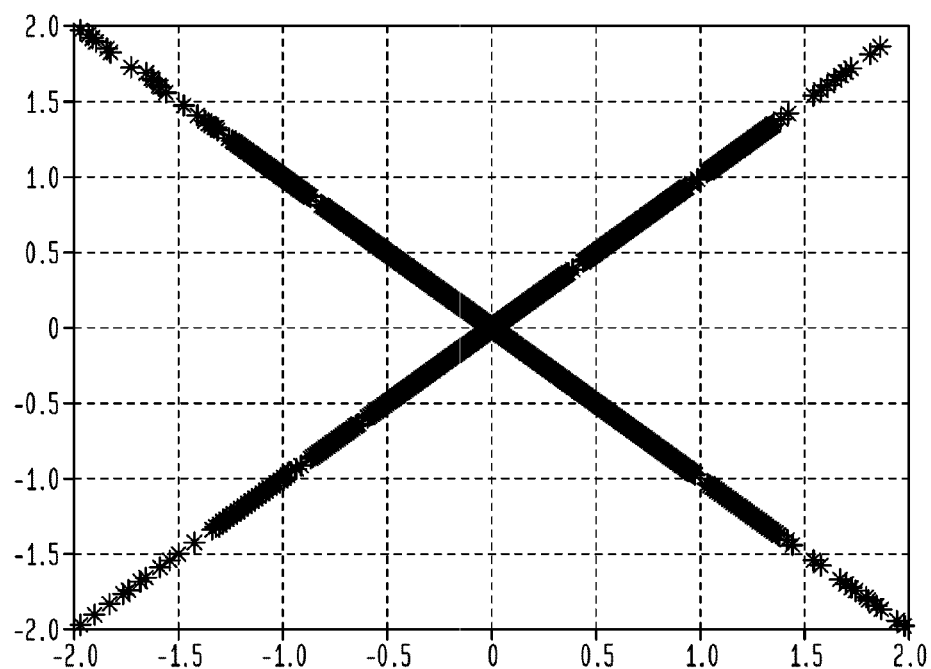
FIG. 15 illustrates an exemplary fan blade type distortion resulting from a multipath distortion manifested on a differentially modulated QPSK signal, in accordance with some embodiments of the invention.

Accordingly, in exemplary embodiments, a received signal may contain multipath distortion that manifests itself onto a differentially modulated QPSK signal as a fan blade type of distortion as is illustrated, for example, in FIG. 15, with no receiver noise. This may not generally pose a problem to the receivers inasmuch as all legacy information may be contained in the phase of the signal, and not in its amplitude. Current legacy receivers may process the signal through a trellis decoder as is, using the fan blade effect to essentially weight the trellis trace back metrics. This step can, for example, remain unchanged to recover the layer one data.

In exemplary embodiments, to recover the layer 2 data (i.e., the overlay data), channel amplitude equalization can be used, for example, to extract the additional data. As discussed above, in exemplary embodiments, the data set can be transmitted with an averaged unity power across each active frequency bin. Thus, at the receiver, one can take advantage of this fact and perform channel equalization across frequency bins to isolate the amplitude modulated overlay signal. For example, at each FFT symbol time, an average power across neighboring active data bins, which may be performed, for example, by a Finite Impulse Response filter, can be used to determine the localized power at the corresponding FFT bins. Channel inversion (e.g., zero forced or Minimum Mean Square Error) can then, for example, be performed on the data bins to restore, as best as possible, the original transmitted symbol amplitude. If this step is taken, the resulting constellation can, for example, be restored as is illustrated in FIG. 16, which consists of two rings prior to differential demodulation.

In exemplary embodiments, overlay data can be decoded, for example, by slicing between the data rings. The vector distance of each point after channel equalization can be computed and compared against a center decision ring, which itself can be determined by, for example, slicing equally between the two received rings, or for example, by calculating the amplitude of reference symbols from adjacent FFT bins that have not been overlay modulated. One of the many advantages of this overlay technique may be the avoidance of a 3 dB loss in detection probability due to the multiplicative effect in differential demodulation. Yet another advantage of this overlay technique is that the data can be modulated in such a manner that the overlay modulated signal may have minimal effect on maximum ratio combining ("MRC") that may be done in legacy systems, inasmuch as this does not increase the Signal to Noise Ratio ("SNR").

As noted, in exemplary embodiments, channel equalization can be used to recover the overlay information contained in the amplitude modulated COFDM signal. This may be implemented, for example, as follows, with reference to FIG. 23.

Figure 22:
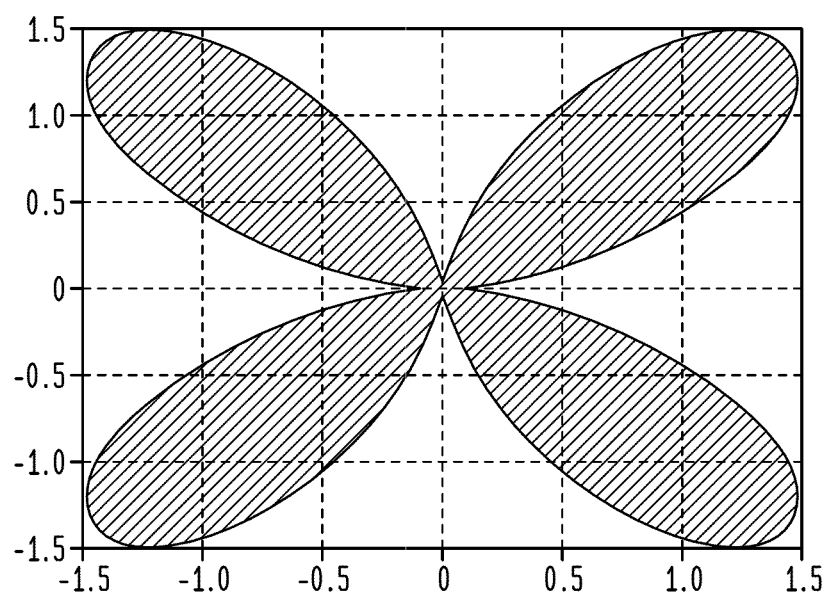
FIG. 22 depicts an exemplary COFDM received QPSK constellation in the absence of channel equalization, in accordance with some embodiments of the invention.

It is noted that due to multi-path conditions, expected in an environment where COFDM would be used, the lack of channel equalization can result in a received QPSK constellation as is illustrated in FIG. 22. Notable is the elongated constellation due to the amplitude variations induced by the multi-path environment. Additionally, the petal-like structure of the received constellation will tend to become wider as the signal-to-noise ratio ("SNR") is decreased.

To perform channel equalization, a reference point may be needed to indicate the unmodified amplitude, so that it can be known what an unmodified one or zero looks like at the receiver end of the channel. Thus, in exemplary embodiments, every $N^{th}$ symbol can remain unmodulated with overlay information, thus leaving it at a unity amplitude for both ones and zeros in the legacy data. In exemplary embodiments, N can be 4, or 5, for example. Or, for example, a rotating pattern can be used, whereby different symbols in the sequence may remain unmodulated over time.

In an exemplary embodiment where N=5, an exemplary system would only overlay 4 symbols, and then leave the $5^{th}$ unmodulated, then overlay the next 4 and then leave the $10^{th}$ symbol alone, etc. The unmodulated symbols may be known as "pilots." By this means, a reference as to what the channel amplitude distortion is for neighboring cells can be obtained. If all of those references are extracted, one may obtain a sense of what the channel is doing in general at a given window of time (the amplitude distortion in general will vary). To correct this channel amplitude distortion, all of the symbols may be multiplied by an inverse of the distortion (i.e., a correction factor) then seen on the pilots (i.e., a 1/x type process). This 1/x process can be applied to all bins, thus undoing the amplitude channel distortion. For convenience, x, the channel state information, will be referred to as $\hat{h}$, and the correction factor as $1/\hat{h}$.

The pilots are extracted as part of a channel estimation procedure. Because the receiver is already synchronized to the data stream, it "knows" which symbols are reference pilots and which are not, and thus which pilots to extract to estimate the channel distortion. Thus, once the pilots are extracted and the data is multiplied by the 1/x correction factor bin for bin, the data stream becomes an equalized channel.

Figure 23:
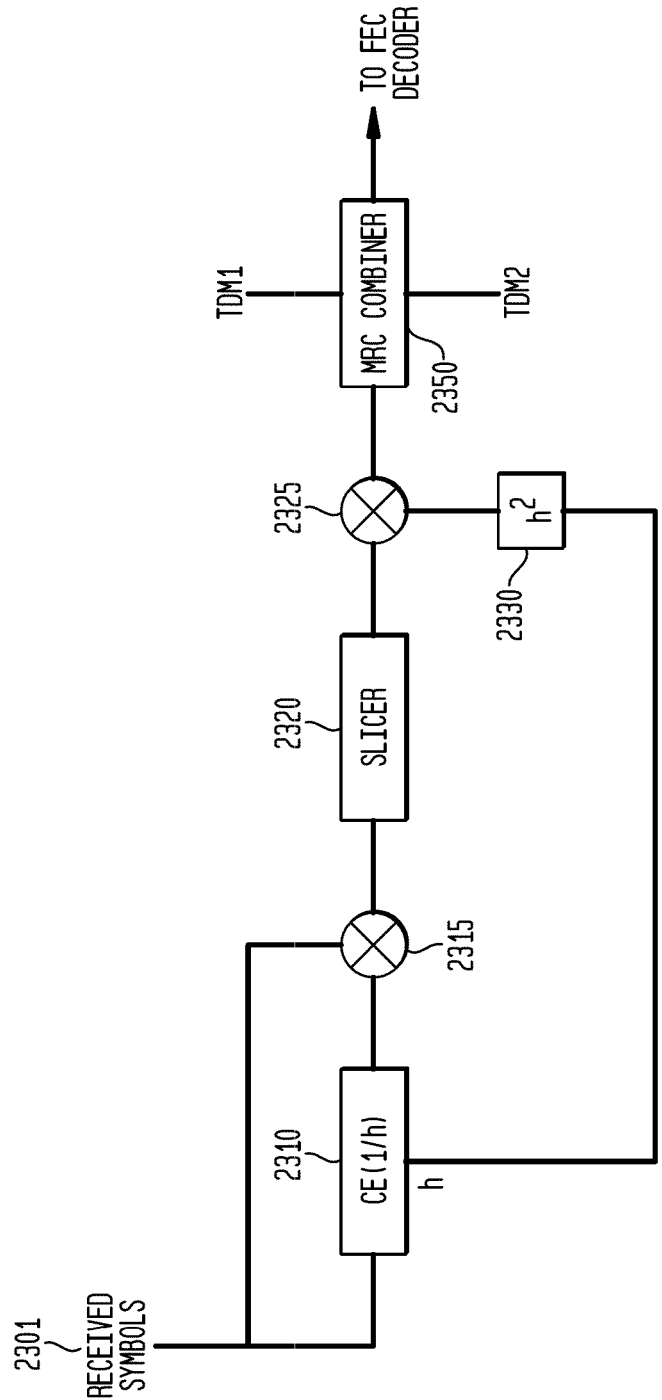
FIG. 23 depicts an exemplary COFDM overlay channel equalization architecture, in accordance with some embodiments of the invention.

FIG. 23 illustrates this process in an overlay receiver 2300. As noted, a legacy receiver will simply see the COFDM overlay amplitude modulations as noise, not affecting the differential phase. With reference to FIG. 23, received symbols 2301 may be sent to a channel equalizer ("CE") 2310, which multiplies the symbols by 1/x, where x is the then current amplitude distortion of the pilots (described in greater detail below). After equalization at 2315 the data symbols may be sent to slicer 2320, which can make a soft decision as to the overlay bit based on the amplitude of the symbol, as described above. Slicer 2320 can determine which of the rings (e.g., inner or outer) the received data symbol is on, as shown in FIG. 16. The received constellation may look essentially like two rings, but if the signal is sufficiently clean, there may also be a ring in the middle, representing the received pilots as well, whose nominal amplitude is unity.

In exemplary embodiments the 1/x ($1/\hat{h}$) channel correction (equalization) factor can be obtained by determining the distortion response of the pilots, and then using a temporal averaging of this channel estimate by using a sliding window of three, and then multiplying (equalizing) each symbol by the inverse of the then prevailing average channel estimate (the average is moving through time).

The overlay amplitude modulation of the COFDM symbols is essentially functionally equivalent to the overlay phase offset used on the TDM symbols. However, it is noted that in exemplary embodiments a greater amplitude offset can be used than the corresponding TDM phase offset. For example, in exemplary embodiments, a COFDM amplitude offset can be the equivalent of 15 degrees of phase offset, whereas the TDM overlay phase offset can be 12 degrees. As noted above, TDM phase offset can be as high as 22.5 degrees, and thus COFDM amplitude offset can be as high as, for example, the equivalent of 28 degrees. Thus, in exemplary embodiments, there can be an unequal overlay phase and amplitude offset for TDM and COFDM, respectively.

Continuing with reference to FIG. 23, the output of slicer 2320 is multiplied by the channel state information squared, or $\hat{h}^2$. This is done because where the channel amplitude distortion is highest, there will be the least confidence in the received symbol. Thus, prior to sending that symbol to MRC Combiner 2350, it can be scaled by multiplication by the square of the channel state information, or $\hat{h}^2$, so as to scale (weight) its contribution to the overall signal by the square of the distortion. Finally, after going through MRC combiner 2350, the symbol can be sent to the overlay decoder.

FIG. 24 depicts an exemplary implementation of COFDM channel equalization. In particular, FIG. 24 is a detail of blocks 2310 through 2330 of FIG. 23 in detail. The processing depicted in FIG. 24 extracts the I and Q values of the pilot symbols at 2410, then obtains the radial squared distance, or $I^2+Q^2$, at 2415. It then takes the square root of those numbers at 2420. This process is performed for every one of the pilots received. Next, at 2425 (block at upper right of FIG. 24), the values for missing data points in between are interpolated using a low pass filter.

Next, at 2430 temporal averaging is performed. Here averaging is shown between a current channel estimate weight "ccew" and a previous channel estimate weight "pcew" (delayed by one time unit), each having equal weighting of 0.5, but as noted, in exemplary embodiments one could also perform averaging using three values, being a ccew, a ppew and a "pppew" ("previous previous channel estimate weight") delayed by two time units, each of the three values having some appropriate weighting (e.g., each at ⅓, or each having a different weight, where weighting is more heavily biased to the current time, for example).

At 2435 the inversion of the temporally averaged channel estimate 1/x is performed (1/x is equivalent to the 1/ĥ of CE 2310 of FIG. 23) and at 2440 the inverse of the channel estimate is multiplied by the delayed symbols (an entire FFT symbol delay so as to match up with the delays of the channel estimation). This multiplication at 2440 is equivalent to the multiplication by 1/ĥ at 2315 of FIG. 23.

At 2445 the ring amplitude is obtained by squaring the equalized symbol and taking its root, and then subtracting the reference ring (i.e., the inner dotted ring of FIG. 16) from said square root, to see if the result is positive or negative. Finally, at 2455, the symbol output from the slicer is multiplied by ĥ² in an analogous manner to 2325 of FIG. 23, to appropriately scale it for input to the MRC combiner. (There is a clipping of the magnitude to a certain level shown as well (at "Saturate"), which may also be implemented if desired).

At 2447, for troubleshooting or internal design use the COFDM channel equalized output can be seen if the signals are connected to an appropriate display or scope, and what is seen is essentially the constellation depicted in FIG. 16, either two rings or two rings and a center ring if the signal is clean. This internal output is not generally used by a consumer or end user.

As noted above, FIG. 22 depicts a typical received QPSK constellation in a multi-path environment. As further noted, the width of the petal-structure is an indication of SNR; the wider the petal, the lower the SNR. This suggests a convenient way of obtaining an SNR estimate in such environments. One can, for example, measure across the width of the petal shape (i.e., perpendicular to the long axis which may essentially be on a radial line out from the origin), and then map the width to SNR ratio. This can be averaged over an entire FFT period and may be fed to an MRC combiner circuit to appropriately weigh the COFDM signal. This method may be implemented where at every physical frame noise levels may be adjusted.

Thus, in exemplary embodiments there are two separate noise calculations. At the physical frame level a physical frame wide SNR is used to calculate the MRC noise value for the COFDM channel, and at that given PF SNR each received symbol is appropriately weighted by the then prevailing channel amplitude distortion.

The amplitude offset used for the overlay data may be conveyed to an overlay receiver (e.g., a receiver equipped to detect both a legacy signal and an overlay signal) by decoding the OIM message. The OIM message may contain the angular offset of the TDM signals. This value may be converted to amplitude offset. Amplitude offset may be calculated by taking the sine of the angular offset and multiplying by the nominal radial distance of the constellation. A total of only 21 different angular offsets may be allowed for the TDM signals, suggesting that the conversion to amplitude offset can be done by a simple table lookup.

Overlay modulation onto the legacy COFDM signal may not take place on all possible legacy carriers. A legacy COFDM system may consist of 1000 data carriers, 2 phase reference carriers, and 1 DC null bin, totaling 1003 "active bins". After the legacy QPSK symbols have been frequency interleaved and differentially encoded, the overlay data may be modulated onto the 8-PSK differentially encoded legacy data, at modulator 286 of FIG. 2, for example. The first contiguous 378 L2 overlay bits from each L2 VSAT CAZAC physical frame may be overlay modulated onto carriers in the range of 1548 to 2048 while using a 2048 IFFT engine, for example. The remaining contiguous 377 overlay bits from each VSAT physical frame may be overlay modulated onto carriers in the range 1 to 502 while using a 2048 IFFT engine, for example.

Figure 17:
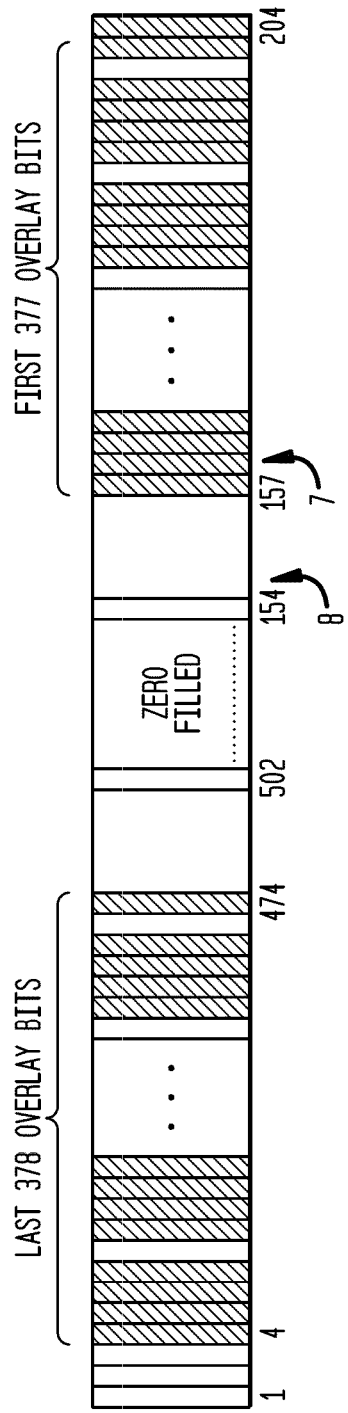
FIG. 17 illustrates Coded Orthogonal Frequency Division Multiplexing ("COFDM") framing, in accordance with some embodiments of the invention.

Not all carriers in the range specified may be overlay modulated. After overlay amplitude modulation is performed, the Inverse FFT process may be performed and Guard interval appending may be performed. FIG. 17 outlines COFDM framing 1700 and the position of the overlay data with respect to the legacy COFDM waveform. FIG. 17 shows the post interleaved and differentially encoded QPSK symbols prior to the inverse FFT operation. Overlay data may be modulated in groups of 4 carriers, for example. FIG. 17 depicts overlay carriers as shaded. Note that legacy carriers may load FFT bins 1 to 502 and 1548 to 2048 (e.g., when using a 2048 IFFT engine).

Figure 18:
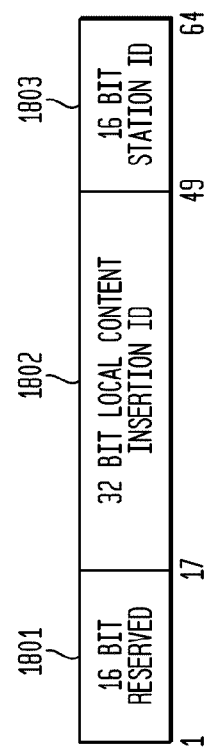
FIG. 18 illustrates Station and Local Content ID ("SLID") insertion, in accordance with some embodiments of the invention.

Terrestrial repeater sites may have the option to transmit a Station and Local Content ID ("SLID") in the overlay data stream and allow for transmission of local overlay content. Each terrestrial repeater (e.g., repeater 36 of FIG. 1) may replace the first and last bits (e.g., first and last 64 bits) of the OIM with bit pattern 1800 shown in FIG. 18. As shown in FIG. 18, for example, portion 1801 including the first 16 bits may be reserved for future usage. If not used, the original 16 bits generated by the OIM may be passed unchanged. The next 32 bits of portion 1802 may be a random sequence, such as the following, if local content is being transmitted on the overlay bit stream: "0x7f4ead26=01111111010011101010110100100110". If local content is not transmitted, the original 32 bits generated by the OIM may be passed unchanged. The last 16 bits of portion 1803 may be used to transmit a unique station ID, for example, which may be transmitted MSB first. The valid range of station ID values may be from 0 to 65535, excluding the value of a normal 64 bit OIM pattern, for example. If station IDs are not inserted, the original 16 bits generated by the OIM may be passed unchanged.

Figure 19:
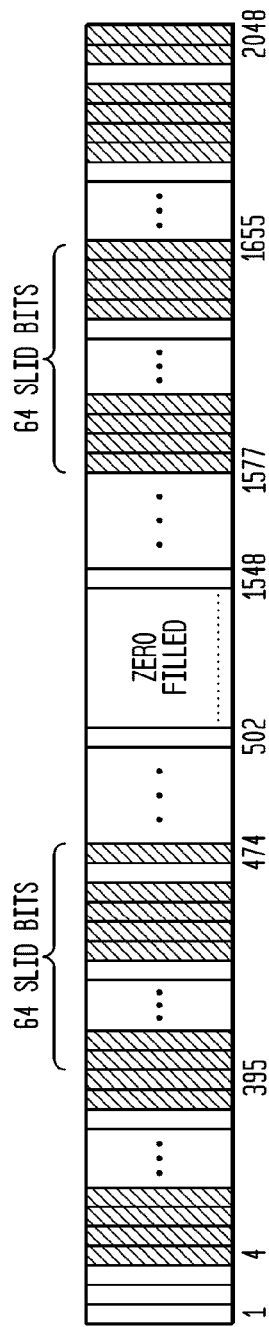
FIG. 19 illustrates SLID framing, in accordance with some embodiments of the invention.

The SLID bits may be framed, as shown by SLID framing portion 1900 of FIG. 19, for example, onto the COFDM carriers in the same location as the original first and last 64 MLSR bits that provide the OIM. SLID bit 1 may map to COFDM active frames 395 and 1577. SLID bit 64 may map to COFDM carriers 474 and 1655. All 64 SLID bits map in consecutive order onto the allowable COFDM carriers.

Figure 20:
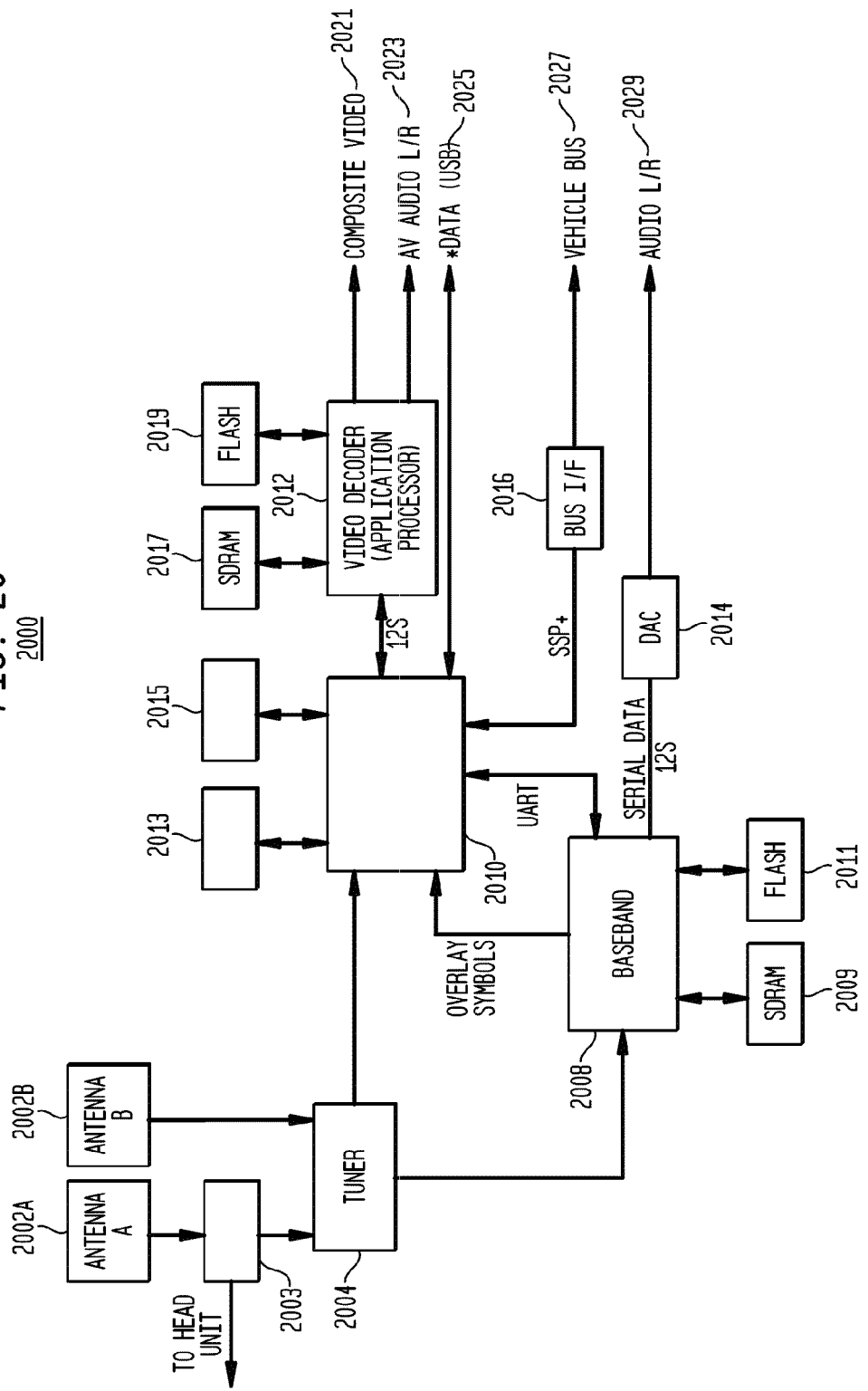
FIG. 20 illustrates an overlay receiver, in accordance with some embodiments of the invention.

A receiver (e.g., receiver 50 of FIG. 1) may be configured to handle and utilize hierarchically modulated information (i.e., an "overlay receiver"). FIG. 20 shows an exemplary embodiment of an overlay receiver 2000. Overlay receiver 2000 may include at least one antenna 2002, a tuner 2004, a baseband 2008, an overlay processor or demodulator 2010, and an application processor or decoder 2012.

The reception of an overlay element of hierarchical modulation by overlay receiver 2000 may require the use of two or more antennas 2002 (e.g., antennas 2002A and 2002B of FIG. 20). Each antenna 2002 of overlay receiver 2000 may have a performance equal to that of a single antenna in a legacy receiver, for example. The actual antenna configuration and positioning of antennas 2002 may be dependent on the "transport" or environment of the receiver (e.g., a vehicle having the receiver installed therein).

Receiver 2000 may include an active splitter element 2003 so that the signal from one of antennas 2002 (e.g., antenna 2002A) may be available to be sent to a "legacy only" receiver that may also be in the transport of the overlay receiver. This other receiver may be an integrated head unit. The antenna coupled to splitter 2003 should be in an optimal reception position on the transport, for example.

Tuner 2004 may be, for example, any satellite radio Tuner ASIC. A Discrete Tuner may alternatively be used due to its enhanced performance, which may mitigate the signal degradation due to overlay modulation. Tuner 2004 may be configured to support two antenna inputs.

Overlay processor 2010 may include a diversity processor and may receive the two IF inputs from tuner 2004. Processor 2010 may perform combining operations on the two signals. A full description of this combining operation is discussed in Scarpa et al. U.S. Patent Publication No. 20070142009, filed Dec. 1, 2006, which is hereby incorporated by reference herein in its entirety.

Baseband 2008 may be, for example, any satellite radio baseband processor, and may be configured to provide the symbol data to be used by the overlay processor (e.g., overlay processor 2010). Baseband 2008 may be a legacy baseband, for example. Overlay processor 2010 may be responsible for many various functions of overlay receiver 2000. For example, overlay processor 2010 may de-multiplex the incoming data, combines the signals from the multiple sets of data provided by baseband processor 2008, decodes the overlay data, perform error correction on the overlay data, close the processing loop to control the a diversity combiner, performs content decryption, perform subscription management tasks (e.g., key management and subscription management), present data to external application processors, channels I2S data from baseband processor 2008 to application processor 2012 (e.g., I2S data can be uncompressed audio or "data"), receive SSP+ Commands (e.g., UART, parse data for overlay and legacy tune commands, and navigation), controls baseband processor 2008 using SSP over a second UART (e.g., if transport sees single client or for security key communication), provide commands to application processor 2012, provide a file system, provide an interface to external devices including storage (e.g., USB 2.0), provide memory Interfaces (e.g., SDR SDRAM to support the 4 second buffer or any de-interleaving, DDR SDRAM, FLASH for the storage of Firmware, Flash Interface designed to support a wide range of FLASH devices and support the industry standard CFI, etc.), and may provide and interface for an additional modulation layer (e.g., Layer 3).

Figure 21:
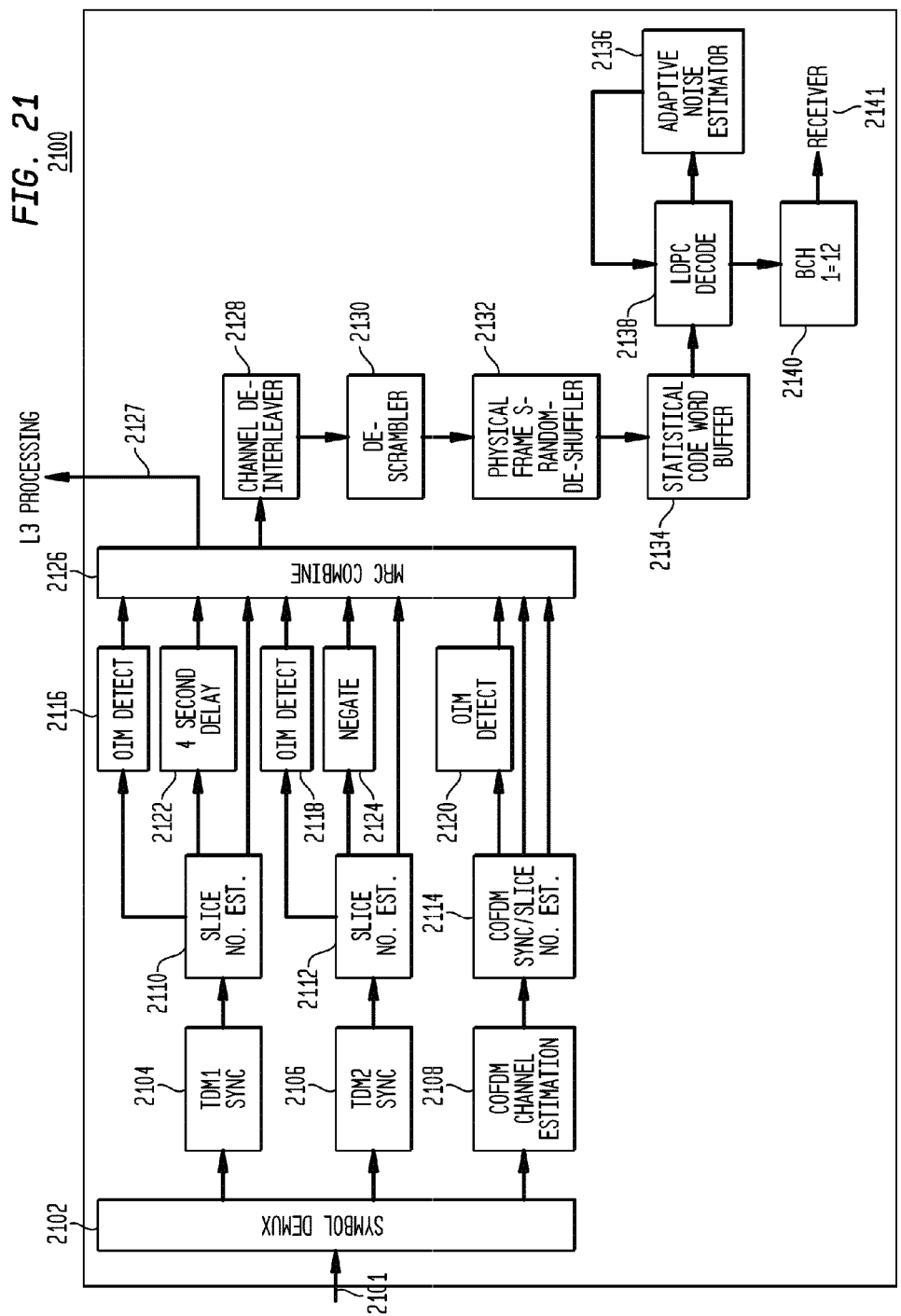
FIG. 21 illustrates a physical layer functional diagram for an overlay receiver, in accordance with some embodiments of the invention.

FIG. 21 shows a physical layer functional diagram for an overlay receiver 2100. Receiver 2100 may include complementary components and may utilize complementary methods of demodulation complementary to those described above with respect to overlay transmission. For example, as shown in FIG. 21, a symbol demultiplexer ("De-Mux") 2102 may receive the symbols for receiver 2100. De-Mux 2102 may demultiplex the received symbols and provide them to a first TDM ("TDM1") Sync 2104, a second TDM ("TDM2") Sync 2106, and a COFDM channel estimator 2108, respectively, the output of which may be provided to a respective Slicer 2110, 2112, 2114. Each slicer may provide a first output to a respective OIM detector 2116, 2118, 2120. Slicer 2110 may provide a second output to a delay module 2122, which may allow TDM1 signal to match the delay provided to each of TDM1 and COFDM signals, as shown in FIG. 2. Slicer 2112 may provide a second output to a negate module 2124. Each slicer may provide a third output to an MRC combiner 2126. Moreover, each OIM detector, delay module 2122, and negate module 2124 may also each provide an output to MRC combiner 2126. Slicer 2114 may provide a third output to MRC combiner 2126 as well. MRC combiner 2126 may provide an output to a chain of modules, including a channel de-interleaver 2128, a de-scrambler 2130, a de-shuffler 2132, a buffer 2134, an LDPC decoder 2138, and a BCH decoder 2140. LDPC decoder 2138 may be coupled to an adaptive noise estimator 2136.

Application processor 2012 of overlay receiver 2000 may be, for example, an Analog Devices BF566 Blackfin DSP running at 300 MHz. The Blackfin may run ucLinux, for example. A video CODEC that supports both a "Microsoft" mode and a "Diagnostic" mode may be used, for example. The Microsoft mode may simultaneously support Windows Media 9 Video Professional Profile at up to 300 kbits/second 320×240 resolution and 30 Hz Frame rate, as well as Windows Media Audio at 32 kbits/second, for example. The diagnostic mode may support a video receiver that may output a standard colorbar test pattern when put in test mode. This may be an OSD output (e.g., 640×480 24 bit color 8 bits of Alpha blend) to the monitor. In some embodiments, the receiver may support both a H.264 (MPEG 4 Part 10) Main Profile at up to 300 kbits/second, 320×240 resolution and up to 30 Hz frame rate, as well as AAC Audio at 32 kbits/second, for example.

An overlay receiver may include memory, such as, for example, 32 MB DDRAM (16M×16 DDR266), 16 MB FLASH, and the like. There may be a test header to enable access to the 656 video. Video decoder 2012 may be housed in a metal enclosure for EMI and environmental shielding with the connectors exiting the box for easy access. The package size for overlay receiver 2000 may be equal to or smaller than 145 mm (side to side)×160 mm (front to back)× 38 mm (top to bottom).

Antenna 2002A input may be the primary antenna input, and may be Fakra SMB (e.g., first part of dual configuration) and keyed to prevent cross connection with a 50 Ohm input. Antenna 2002B may be a diversity antenna input, and may be Fakra SMB (e.g., second part of dual configuration) and keyed to prevent cross connection with a 50 Ohm input. An optional antenna output to a head unit may be Fakra SMB (e.g., single configuration) and may be keyed to prevent cross connection.

A default protocol for an overlay receiver may be SSP+. For OEM applications, an overlay receiver may use protocols specific for that OEM, and the translation of the OEM protocols to the internal SSP+ may be performed on the controller in the receiver.

In exemplary embodiments, the disclosed systems and methods can be implemented in hardware, software, firmware, or any combination of the above, and can be implemented in a transmitter or transmission device. Similarly, complementary systems and methods of demodulation can be provided in a similar manner and implemented in a demodulator or a receiver. For example, a program storage device, such as a microprocessor with memory, or for example, a separate microprocessor memory, can store a program of instructions sufficient to implement exemplary methods of the invention.

While there have been described systems and methods for transmitting and receiving additional data, such as video, over pre-existing ("legacy") digital satellite radio signals, with reference to certain exemplary embodiments, it is to be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed:

1. A method of transmitting information over a satellite digital audio radio service ("SDARS") system, comprising:
first modulating a digital legacy signal using a first digital modulation scheme to encode the legacy signal into a first data stream of symbols;
second modulating each of the symbols in the first data stream using a second digital modulation scheme to encode at least one additional digital signal,
wherein the second digital modulation scheme adds at least one additional bit to each symbol of the first data stream by changing a combination of amplitude and/or phase offsets of the symbol of the first data stream to obtain twice modulated symbols;
transmitting the twice modulated symbols over a satellite channel,
wherein each of the legacy signal and the at least one additional digital signal contain a different synchronization signal;
receiving the twice modulated symbols at a receiver;
detecting direction of the amplitude and/or phase offsets of the received twice modulated symbols;
first demodulating the received twice modulated symbols to extract the digital legacy signal; and
second demodulating the second modulation scheme using the detected direction of the amplitude and/or phase offsets to extract the at least one additional digital signal.

2. The method of claim 1, wherein the at least one additional signal is a video signal.

3. The method of claim 2, wherein the first demodulating comprises using a legacy baseband decoder integrated circuit, and wherein the second demodulating comprises using a video decoder integrated circuit.

4. The method of claim 3, wherein the receiver is a video/audio receiver comprising a video display, the video decoder integrated circuit, and the legacy baseband decoder integrated circuit.

5. The method of claim 4, wherein the receiver is installed in a vehicle, and wherein the video signal is displayed on the video display.

6. The method of claim 1, wherein the receiving comprises using antenna diversity.

7. The method of claim 1, wherein the first modulation scheme is a Time Division Multiplexing ("TDM") scheme.

8. The method of claim 7, wherein the first modulation scheme is a Quadrature Phase Shift Keying ("QPSK") scheme.

9. The method of claim 7, wherein the second modulating comprises phase modulating the first-modulated symbols.

10. The method of claim 1, wherein the first modulation scheme is a Frequency Division Multiplexing ("FDM") scheme.

11. The method of claim 10 wherein the first modulation scheme is a Coded Orthogonal Frequency Division Multiplexing ("COFDM") scheme.

12. The method of claim 10, wherein the second modulating comprises phase modulating the first-modulated symbols.

13. The method of claim 10, wherein the second modulating comprises amplitude modulating the first-modulated symbols.

14. The method of claim 1, wherein the at least one additional signal is a video signal.

15. The method of claim 1, wherein the receiver comprises a legacy receiver.

16. A satellite digital audio radio service ("SDARS") system, comprising:
a transmitter portion configured to:
first modulate a digital legacy signal using a first digital modulation scheme to encode the legacy signal into a first data stream of symbols;
second modulate each of the symbols in the first data stream using a second digital modulation scheme to encode at least one additional digital signal,
wherein the second digital modulation scheme adds at least one additional bit to each symbol of the first data stream by changing a combination of amplitude and/or phase offsets of the symbol of the first data stream to obtain twice modulated symbols;
transmit the twice modulated symbols over a satellite channel,
wherein each of the legacy signal and the at least one additional digital signal contain a different synchronization signal;
and a receiver portion configured to:
receive the twice modulated symbols;
detecting direction of the amplitude and/or phase offsets of the received twice modulated symbols;
first demodulate the received twice modulated symbols to extract the digital legacy signal; and
second demodulate the second modulation scheme using the detected direction to extract the at least one additional signal.

17. The system of claim 16, wherein the at least one additional signal is a video signal.

18. The system of claim 17, wherein the receiver portion comprises:
a legacy baseband decoder integrated circuit configured to first demodulate the symbols; and
a video decoder integrated circuit configured to second demodulate the second layer of modulation.

19. The system of claim 18, wherein the receiver portion is a video/audio receiver and further comprises a video display.

20. The system of claim 19, wherein the receiver portion is installed in a vehicle, and wherein the receiver portion is further configured to display the video signal on the video display.

21. The system of claim 16, wherein the receiver portion is configured to receive the twice modulated symbols using antenna diversity.

22. The system of claim 16, wherein the first modulation scheme is a Time Division Multiplexing ("TDM") scheme.

23. The system of claim 22, wherein the first modulation scheme is a Quadrature Phase Shift Keying ("QPSK") scheme.

24. The system of claim 22, wherein the second layer of modulation comprises a phase modulation of the first-modulated symbols.

25. The system of claim 16, wherein the first modulation scheme is a Frequency Division Multiplexing ("FDM") scheme.

26. The system of claim 25 wherein the first modulation scheme is a Coded Orthogonal Frequency Division Multiplexing ("COFDM") scheme.

27. The system of claim 25, wherein the second layer of modulation comprises a phase modulation of the first-modulated symbols.

28. The system of claim 25, wherein the second layer of modulation comprises an amplitude modulation of the first-modulated symbols.

29. The system of claim 16, wherein the at least one additional signal is a video signal.

30. The system of claim 16, wherein the receiver portion comprises a legacy receiver.

31. A method of transmitting information over a satellite digital audio radio service ("SDARS") system, comprising:
 error correction encoding at least one additional digital signal;
 interleaving at least one error correction encoded additional signal with an overlay identification marker ("OIM");
 first modulating a digital legacy signal using a first digital modulation scheme to encode the legacy signal into a first data stream of symbols;
 second modulating each of the symbols in the first data stream using a second digital modulation scheme to encode the at least one interleaved error correction encoded additional signal;
 wherein the second digital modulation scheme adds at least one additional bit to each symbol of the first data stream by changing a combination of amplitude and/or phase offsets of the symbol of the first data stream to obtain twice modulated symbols;
 transmitting the twice modulated symbols over a satellite channel,
 wherein each of the legacy signal and the at least one interleaved error correction encoded additional signal contain a different synchronization signal;
 receiving the twice modulated symbols at a receiver;
 detecting direction of the amplitude and/or phase offsets of the received twice modulated symbols;
 first demodulating the received twice modulated symbols to extract the digital legacy signal; and
 second demodulating the second modulation scheme using the detected direction of the amplitude and/or phase offsets to extract the at least one interleaved error correction encoded additional digital signal.

32. The method of claim 31, wherein the OIM conveys a characteristic of the second layer of modulation.

33. The method of claim 32, wherein the characteristic is an amount of an overlay offset modulation.

34. A satellite digital audio radio service ("SDARS") system, comprising:
 an overlay forward error correction ("OFEC") encoding portion comprising:
  an error correction encoder for encoding at least one additional digital signal; and
  a channel interleaver coupled to an output of the error correction encoder for channel interleaving at least one error correction encoded additional signal with an overlay identification marker ("OIM"); and
 an overlay modulation portion coupled to the channel interleaver, wherein the overlay modulation portion is configured to:
  first modulate a legacy digital signal using a first digital modulation scheme to encode the legacy signal into a first data stream of symbols;
  second modulate each of the symbols in the first data stream using a second digital modulation scheme to encode the at least one interleaved error correction encoded additional signal;
  wherein the second digital modulation scheme adds at least one additional bit to each symbol of the first data stream by changing a combination of amplitude and/or phase offsets of the symbol of the first data stream to obtain twice modulated symbols;
  wherein each of the legacy signal and the at least one interleaved error correction encoded additional signal contain a different synchronization signal; and
 a transmitter portion configured to transmit the twice modulated symbols over a satellite channel, and
 a receiver portion configured to:
  receive the twice modulated symbols at a receiver;
  detect the direction of the amplitude and/or phase offsets of the received twice modulated symbols;
  first demodulate the received twice modulated symbols to extract the digital legacy signal; and
  second demodulate the second modulation scheme using the detected direction of the amplitude and/or phase offsets to extract the at least one interleaved error correction encoded additional digital signal.

35. The transmitter portion of claim 34, wherein the OIM conveys a characteristic of the second layer of modulation.

36. The transmitter portion of claim 35, wherein the characteristic is an amount of an overlay offset modulation.

* * * * *